(12) United States Patent
Hayes et al.

(10) Patent No.: US 9,797,572 B2
(45) Date of Patent: Oct. 24, 2017

(54) TWO WAY OMNIDIRECTIONAL LENS

(71) Applicant: Trimble Navigation Limited, Sunnyvale, CA (US)

(72) Inventors: James N. Hayes, Urbana, OH (US); Chris W. Snyder, Union City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 327 days.

(21) Appl. No.: 14/524,691

(22) Filed: Oct. 27, 2014

(65) Prior Publication Data

US 2016/0116138 A1 Apr. 28, 2016

(51) Int. Cl.
| | |
|---|---|
| *F21V 3/00* | (2015.01) |
| *F21V 5/04* | (2006.01) |
| *G01C 15/00* | (2006.01) |
| *G02B 19/00* | (2006.01) |
| *F21V 7/00* | (2006.01) |
| *F21W 111/00* | (2006.01) |
| *F21W 131/40* | (2006.01) |
| *F21Y 115/10* | (2016.01) |

(52) U.S. Cl.
CPC ............ *F21V 5/046* (2013.01); *F21V 7/0091* (2013.01); *G01C 15/002* (2013.01); *G02B 19/008* (2013.01); *G02B 19/009* (2013.01); *G02B 19/0028* (2013.01); *G02B 19/0061* (2013.01); *G02B 19/0071* (2013.01); *G02B 19/0085* (2013.01); *F21W 2111/00* (2013.01); *F21W 2131/40* (2013.01); *F21Y 2115/10* (2016.08)

(58) Field of Classification Search
CPC ..... F21V 5/046; F21K 9/232; G02B 19/0076; G02B 19/008; G02B 19/0085; G01C 15/002; G01C 15/004; G01C 15/006
See application file for complete search history.

(56) References Cited

U.S. PATENT DOCUMENTS 5,452,135 A * 9/1995 Maki .......................... G01J 1/04
250/342
6,201,246 B1 * 3/2001 Potekev ............... G02B 19/009
250/353

(Continued)

FOREIGN PATENT DOCUMENTS

| EP | 2 743 740 | 6/2014 |
|---|---|---|
| FR | 1 528 819 | 6/1968 |

OTHER PUBLICATIONS

PCT International Preliminary Report on Patentability (May 2, 2017).
Isa International Search Report (Nov. 17, 2015).

*Primary Examiner* — Sean Gramling
(74) *Attorney, Agent, or Firm* — Frederick H. Gribbell; Aaron S. Brodsky

(57) ABSTRACT

An omnidirectional lens is disclosed of the type which captures light from virtually all angles of incidence, and also emits light in all directions. Embodiments are specifically disclosed as a two-way lens that receives light beams from all directions of the compass and directs those light beams to a photosensor. The same two-way lens acts in a "beacon mode" to produce light beams from one or more LEDs, and to emit such light beams (again) in all directions of the compass. The emitted light beams can also be used to signal various functions as visible signals to users on a jobsite.

10 Claims, 20 Drawing Sheets

(56) References Cited

U.S. PATENT DOCUMENTS

| | | | |
|---|---|---|---|
| 7,524,098 B2 * | 4/2009 | Vennetier | G02B 19/0071 359/727 |
| 2009/0129097 A1 * | 5/2009 | Ewert | B29C 45/0025 362/328 |

* cited by examiner

TWO WAY OMNIDIRECTIONAL LENS

TECHNICAL FIELD

The technology disclosed herein relates generally to surveying and construction equipment and is particularly directed to an omnidirectional lens of the type which captures light from virtually all angles of incidence, and also emits light in all directions. Embodiments are specifically disclosed as a two-way lens that receives light beams from all directions of the compass and directs those light beams to a photosensor; and the same two-way lens can act in a "beacon mode" to emit light beams from one or more LEDs, and to emit such light beams (again) in all directions of the compass.

The omnidirectional lens of the technology disclosed herein is formed, in a preferred embodiment, by starting with a two-piece construction that is permanently made into a single piece assembly. There is a main "reflector" portion and a "top cap" portion; the top cap portion is generally circular and receives light beams from all angles, and re-directs those light beams at an angle of about (roughly) 90 degrees. Therefore, if a light beam travelling horizontally (i.e., parallel to the Earth's surface) is intercepted by the top cap portion, that light beam will be re-directed downward, in a somewhat vertical direction.

The reflector portion (below the top cap portion) then receives such re-directed light beams, and with its surfaces that take advantage of total internal reflection ("TIR"), will further re-direct the light beams and will concentrate such light beams toward an extended light guide portion that also takes advantage of the same TIR principle by "aiming" (or guiding) such light beams toward a photosensor that is positioned beneath the extended light guide portion of the reflector portion. In this manner, the photosensor receives light rays (or "light beams") that impact the omnidirectional lens from multiple angles of incidence, virtually around the entire compass—i.e., 360 degrees of reception, without the use of any moving parts.

With regard to emitting light beams in the beacon mode, the omnidirectional lens of the technology disclosed herein includes at least one photon-emitting electronic device, such as an LED (light emitting diode), that emits light beams at a plurality of many, many angles. (The LED is not a laser diode.) Many of those emitted light beams are received by shaped surfaces of the reflector portion, and then re-directed both upward and outward, along the outer surfaces of the omnidirectional lens device. The top cap portion has a cylindrically-shaped surface that has a textured outer surface, and this texturing causes the outward-going light beams (as photons) to be re-directed one final time into many, many angles, without the use of any moving parts. The large plurality of such emission angles allows human users near the omnidirectional lens device to see at least one of the light beams no matter where those human users are positioned on the jobsite surface, as compared to the position of the omnidirectional lens device.

When the omnidirectional lens of the technology disclosed herein is used with a Trimble base unit, many types of functions can be performed and indicated, for use on a construction jobsite. This includes a function of establishing an alignment axis between two such base units, and other various visible (optical) indicating functions that will be seen by human users on the jobsite.

BACKGROUND

On construction jobsites, there is a need for locating points of interest on two-dimensional horizontal surfaces. A simple, accurate and cost effective system for the layout of floor plans at the jobsite has long been in need. Conventional GPS is not usable inside standard steel construction buildings, and previous laser based systems have been overly complex and expensive.

Two earlier patent documents have advanced the art in this area in a significant way, disclosing a laser system that provides the elements for visually locating points of interest on a two-dimensional horizontal surface. A pair of "base units" are placed on the jobsite surface, and these base units have certain capabilities that are described in those earlier patent documents. One of these documents is U.S. Pat. No. 8,087,176; a second such document is published application number US 2012/0203502; both patent documents are commonly-assigned to Trimble Navigation Limited.

The published application teaches using a fan beam, consisting of modulated laser light that is emitted by a first base unit. The base units have a "null-position" photosensor that can delineate horizontal positioning, and can help aim the fan beam until it is directly striking the center portion of a second base unit. The goal is to adjust the aim of the fan beam of the first base unit until it strikes directly at the centerline of the horizontal-sensitive (null-position) photosensor on the second base unit. This procedure is used in establishing an alignment axis between the two base units.

It would be beneficial to have an omnidirectional photosensor on each base unit, to help begin the process of "finding" the other base unit, before the more precise positioning commands are commenced using the null-position photosensor. For example, without an omnidirectional sensor on the base units, if the second base unit's null-position photosensor is pointing away from the first base unit at the moment the first base unit's rotating fan beam strikes the second base unit, then that null-position photosensor (which does not extend 360 degrees around the base unit) would not be aware of that fan beam striking the second base unit, so valuable time would be lost, waiting for the next attempt. (Both base units rotate their fan beams—along with their null-position photosensors—about a vertical axis, so that the fan beams can point at any azimuth angle on the jobsite.)

SUMMARY

Accordingly, it is an advantage to provide an omnidirectional lens that receives light beams from all directions of the compass and directs those light beams to a photosensor.

It is another advantage to provide an omnidirectional lens that can act in a "beacon mode" to emit light beams from one or more LEDs, and to emit such light beams in all directions of the compass.

It is yet another advantage to provide an omnidirectional two-way lens of the type which captures light from virtually all angles of incidence around the compass, and also emits light in virtually all directions around the compass.

It is still another advantage to provide an omnidirectional lens that emits light beams in a beacon mode, using at least one photon-emitting electronic device, such as an LED (light emitting diode), that emits light beams that are received by shaped surfaces of lens device, and then re-directed both upward and outward, toward the outer surfaces of the omnidirectional lens device, to be emitted at all angles of the compass.

It is a further advantage to provide an omnidirectional lens that emits light beams in a beacon mode, using at least one photon-emitting electronic device, such as an LED (light emitting diode), that emits light beams that are directed to a top cap portion having a cylindrically-shaped surface that has a textured outer surface, and this texturing causes the outward-going light beams (as photons) to be re-directed one final time into many, many angles.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an omnidirectional lens apparatus is provided, which comprises: (a) a light-conductive first portion; (b) a light-conductive second portion, wherein the first portion is mounted adjacent to the second portion; (c) the first portion being substantially cylindrical in shape, having a first outer perimeter, the first portion having a first surface that faces toward and is proximal to the second portion, and the first portion having a second surface that faces away from and is distal to the second portion; and (d) the second portion being generally cylindrical in shape at a second outer perimeter that is proximal to the first portion, the second portion having a generally conical third surface that is proximal to the first portion, and the second portion having a fourth surface that faces away from and is distal to the first portion, the fourth surface forming a protrusion extending to a distal end; (e) wherein: the first outer perimeter exhibits a textured surface finish.

In accordance with another aspect, an omnidirectional lens assembly is provided, which comprises: (a) at least one photosensor; (b) at least one light-emitting device; (c) a light-conductive material that passes light beams at predetermined light wavelengths; wherein: (i) the light-conductive material has first surfaces that receive first light beams from at least one external source at a plurality of angles with respect to a predetermined plane, in which the first surfaces are shaped to re-direct at least a portion of the first light beams to the at least one photosensor that is positioned proximal to the light-conductive material; (ii) the light-conductive material has second surfaces, the second surfaces that receive second light beams emitted by the at least one light-emitting device that is positioned proximal to the light-conductive material; and (iii) the light-conductive material has third surfaces, the light-conductive material being shaped to re-direct at least a portion of the second light beams toward the third surfaces, the third surfaces having a textured surface finish to scatter light into a plurality of directions with respect to the predetermined plane.

In accordance with yet another aspect, an omnidirectional lens assembly is provided, which comprises: (a) at least one photosensor; (b) at least one light-emitting device; (c) a substantially light-conductive material that passes light beams at predetermined light wavelengths, the light conducting material having: (i) a first surface portion for receiving externally-produced first light beams; (ii) a second surface portion that is positioned proximal to the at least one photosensor; (iii) a third surface portion that is positioned proximal to the at least one light-emitting device; (iv) a fourth surface portion for emitting light beams, the fourth surface portion having a textured surface finish; and (v) a fifth portion that is shaped to direct at least a portion of the received first light beams from the first surface portion toward the second surface portion; (d) a first circuit pathway for sending signals from the at least one photosensor to an external device; and (e) a second circuit pathway for receiving signals from an external device to the at least one light-emitting device; (f) wherein: (i) the first surface portion is shaped to receive the first light beams from substantially every direction in a substantially horizontal plane; (ii) the third surface portion is shaped to receive second light beams from the at least one light-emitting device, and to direct at least a portion of the second light beams toward the fifth portion; (iii) the fifth portion is also shaped to receive the at least a portion of the second light beams from the third portion, which comprise third light beams, and to direct at least a portion of the third light beams toward the fourth surface portion; (iv) the fourth surface portion is shaped to receive the at least a portion of the third light beams, which comprise fourth light beams, and to emit at least a portion of the fourth light beams at a plurality of directions that includes substantially every direction in the substantially horizontal plane.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
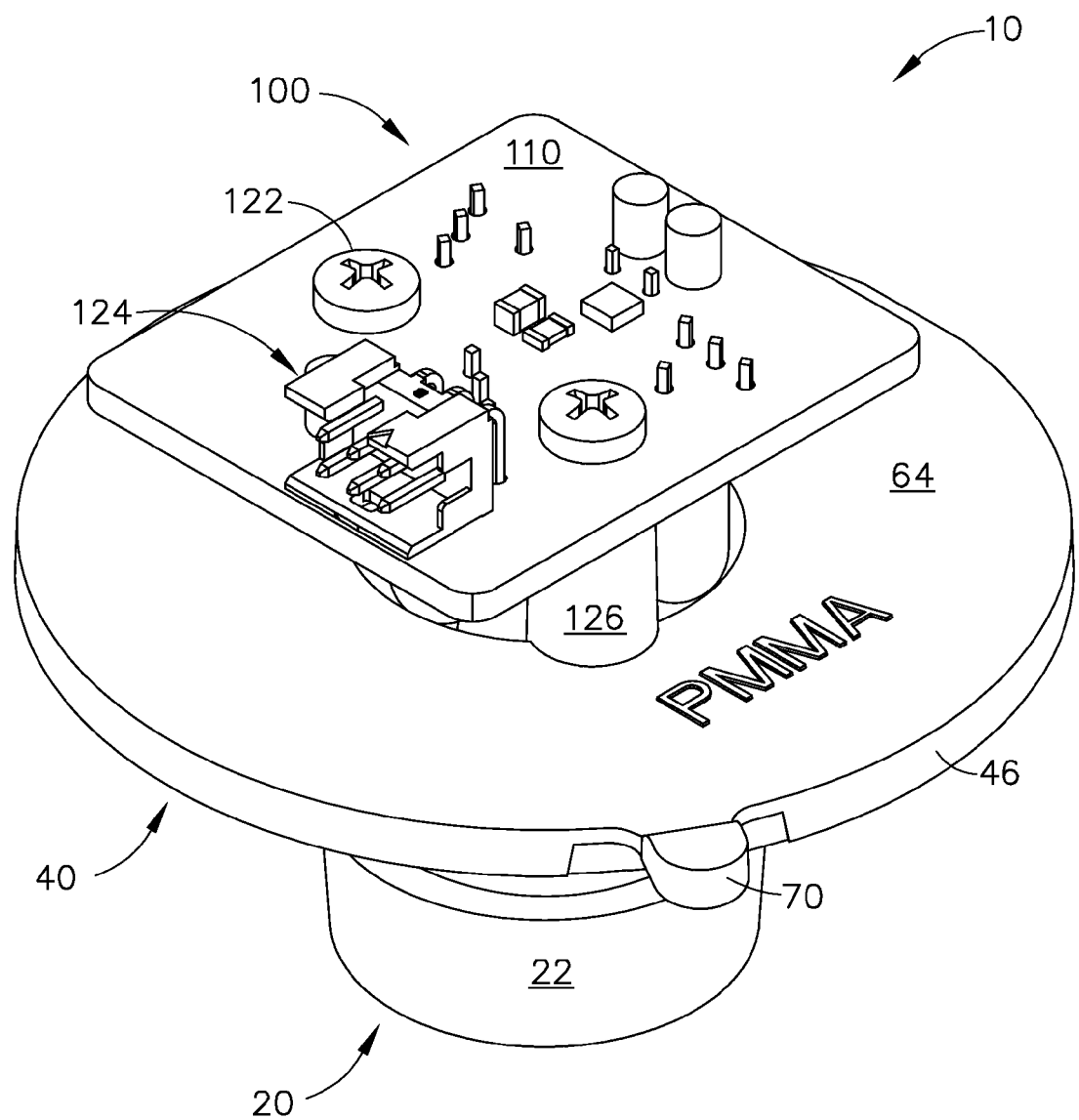
FIG. 1 is a perspective view of a two-way omnidirectional lens, showing the lens upside down, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

Referring now to FIG. 1, a two-way omnidirectional lens, generally referred to by the reference numeral 10, is illustrated, having a top cap portion at reference numeral 20, a reflector portion at reference numeral 40, and an electronic subassembly at the reference numeral 100. In this view, the bottom side of the printed circuit board is depicted at 110, and shows mounting screws 122, and an electrical connector at 124. This view of FIG. 1 is upside down, and hence the bottom side of the circuit board 110 is seen.

Since FIG. 1 is upside down with regard to the typical orientation of the lens 10, the "top cap" 20 is at the bottom of this view. The main cylindrical outer surface is depicted at 22 of this top cap 20. The reflector portion 40 has a larger outer diameter having an outer circumferential surface at 46, and a bottom surface at 64. This enlarged portion defined by the area 64 and the outer circumferential surface 46 is part of a mounting flange, which also has a small protrusion or tab at one position along its circumference at the reference numeral 70. A pedestal at 126 is designed into the reflector portion to receive one of the mounting screws 122 of the printed circuit board.

Figure 2:
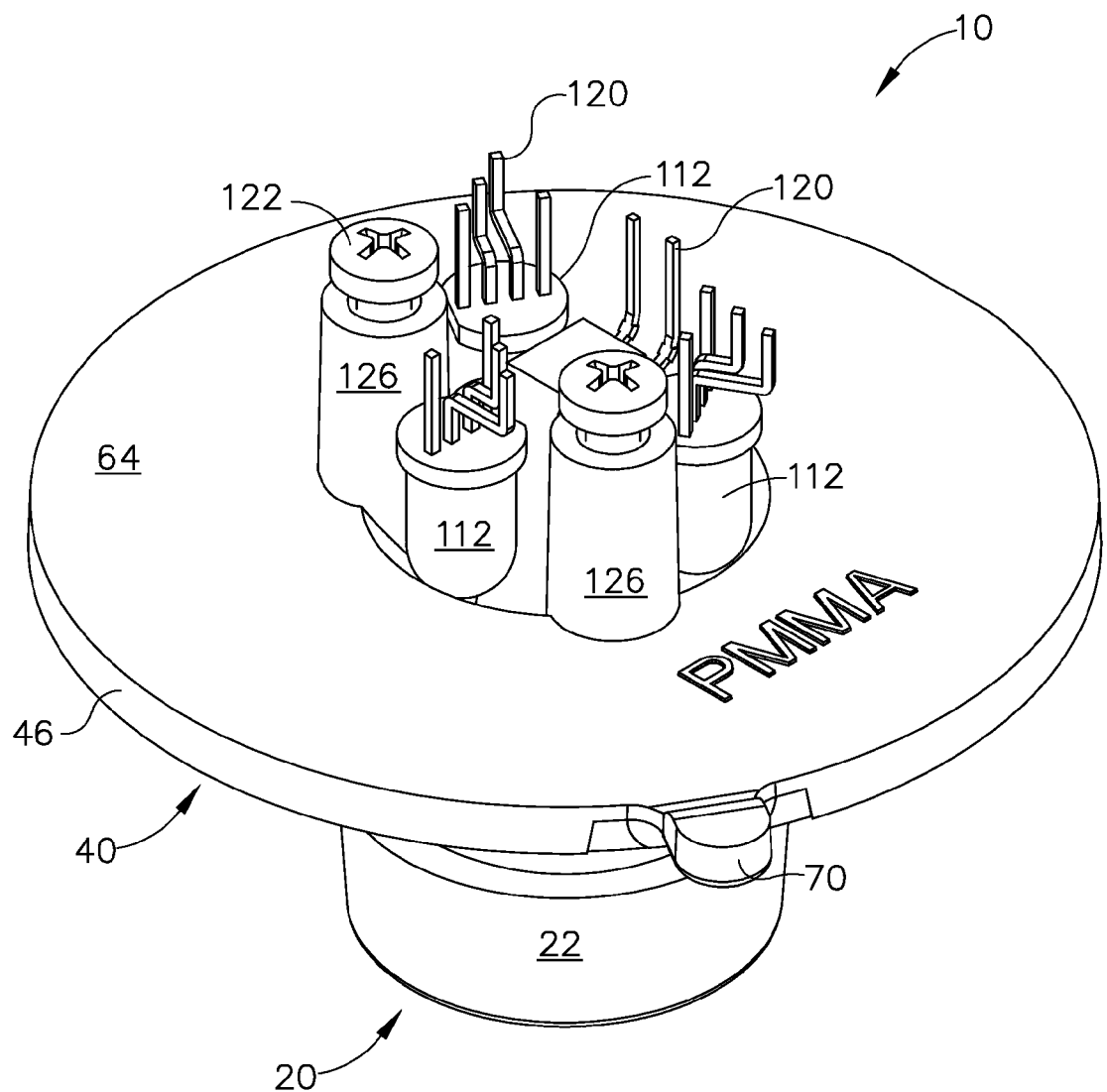
FIG. 2 is a perspective view of the two-way omnidirectional lens of FIG. 1, also an upside down view, showing the components without the printed circuit board.

Referring now to FIG. 2, the lens 10 is seen in a very similar orientation, however, the printed circuit board 110 has been removed from this view. Without the P.C. board other components can be seen in this view. For example, both screw pedestals 126 are visible, as well as three light emitting diodes (LEDs) at 112. In addition, there are electrical leads 120 that extend from the major electrical components that are visible in FIG. 2. These electrical leads 120 are typically made of a conductive metal.

Figure 3:
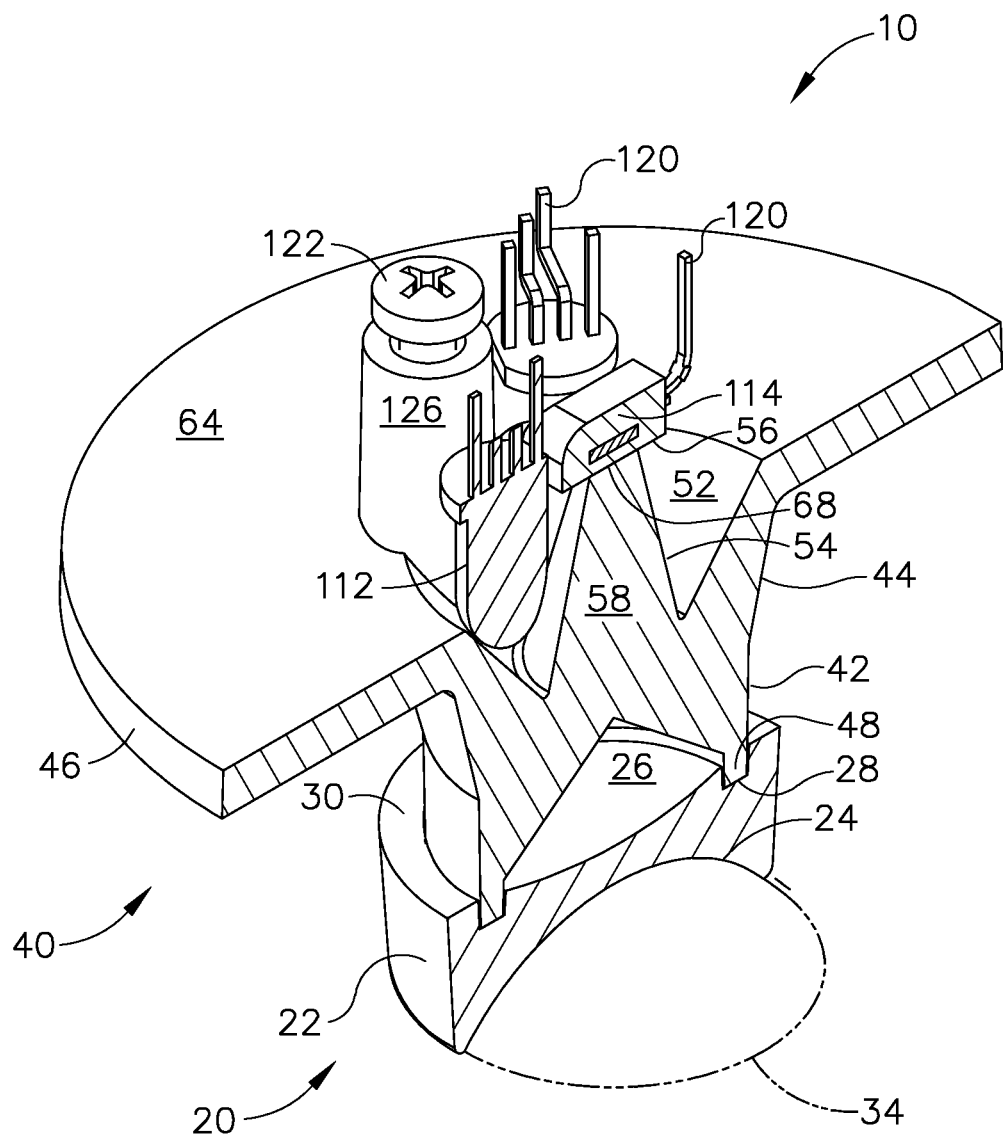
FIG. 3 is a partial cutaway view in perspective of the lens of FIG. 1, also an upside down view, showing details of how the top cap and the reflector portions are mated together.

Referring now to FIG. 3, a major portion of the lens 10 is visible in a cutaway view, which exposes the shapes of some of the internal surfaces of these major components. With regard to the top cap 20, there is a flange-like surface 30 that runs circumferentially around the lower surface of the top cap portion, there is a spherical-shaped interior surface at 24, and there is an arcuate and concave surface 26 that faces the reflector portion 40. There also is a circular notch 28 that receives a mating circular protrusion 48 of the reflector 40. Finally, part of the shape 24 is continued in phantom lines at 34, to show the overall outer circular shape of the conical portion 24, which preferably is painted a bright color (such as white) on its outer surface, with a matte finish. As an alternative to a matte finish, the outer spherical surface 24 could be dimpled, or have some other form of textured finish. The effect of this textured finish, whether it comprises a matte finish or some other type of surface roughness, will be described below in greater detail.

Figure 5:
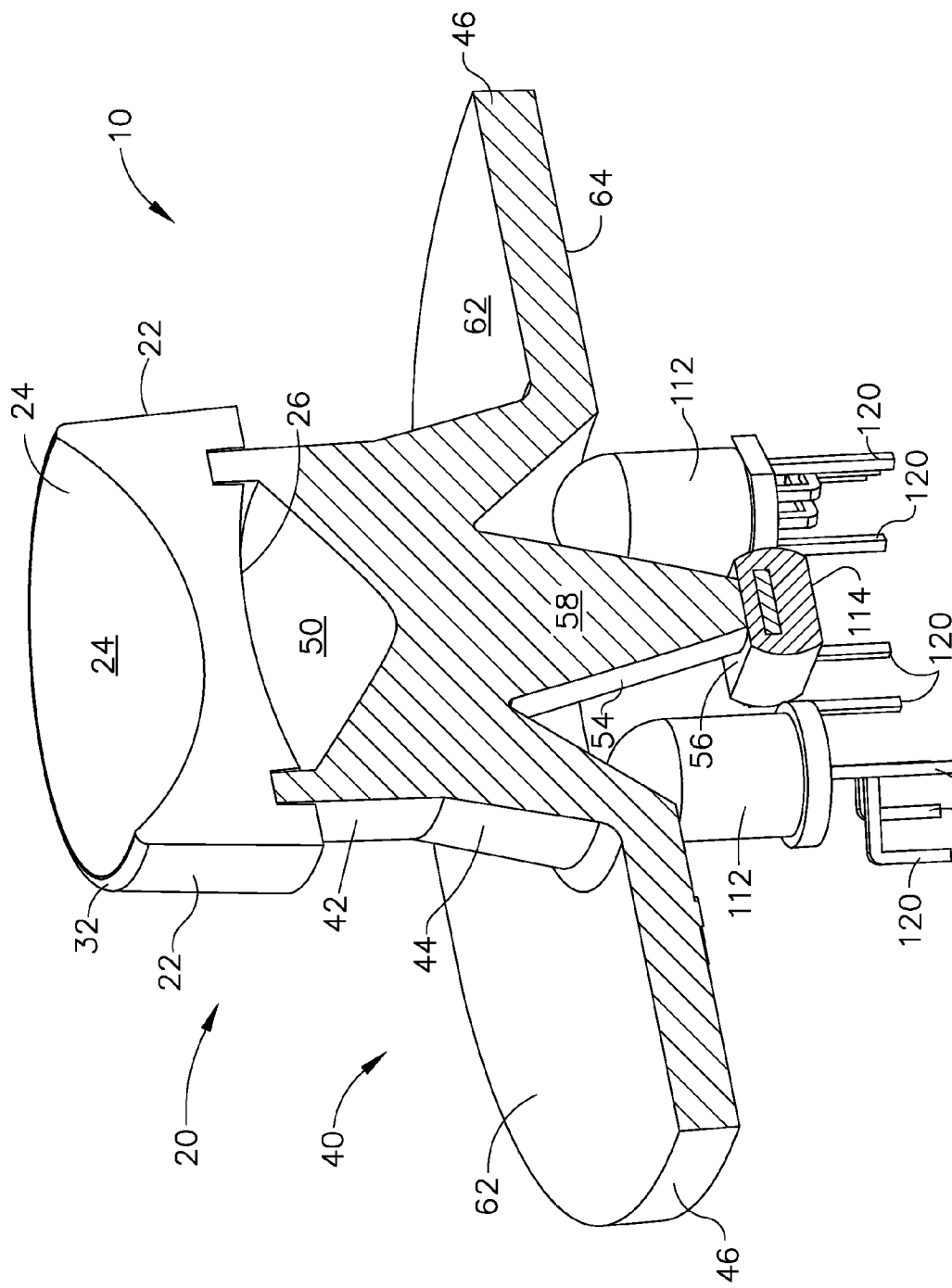
FIG. 5 is a partial cutaway view in perspective of the lens of the lens of FIG. 1, this time showing the lens right side up, as viewed from above.
Figure 6:
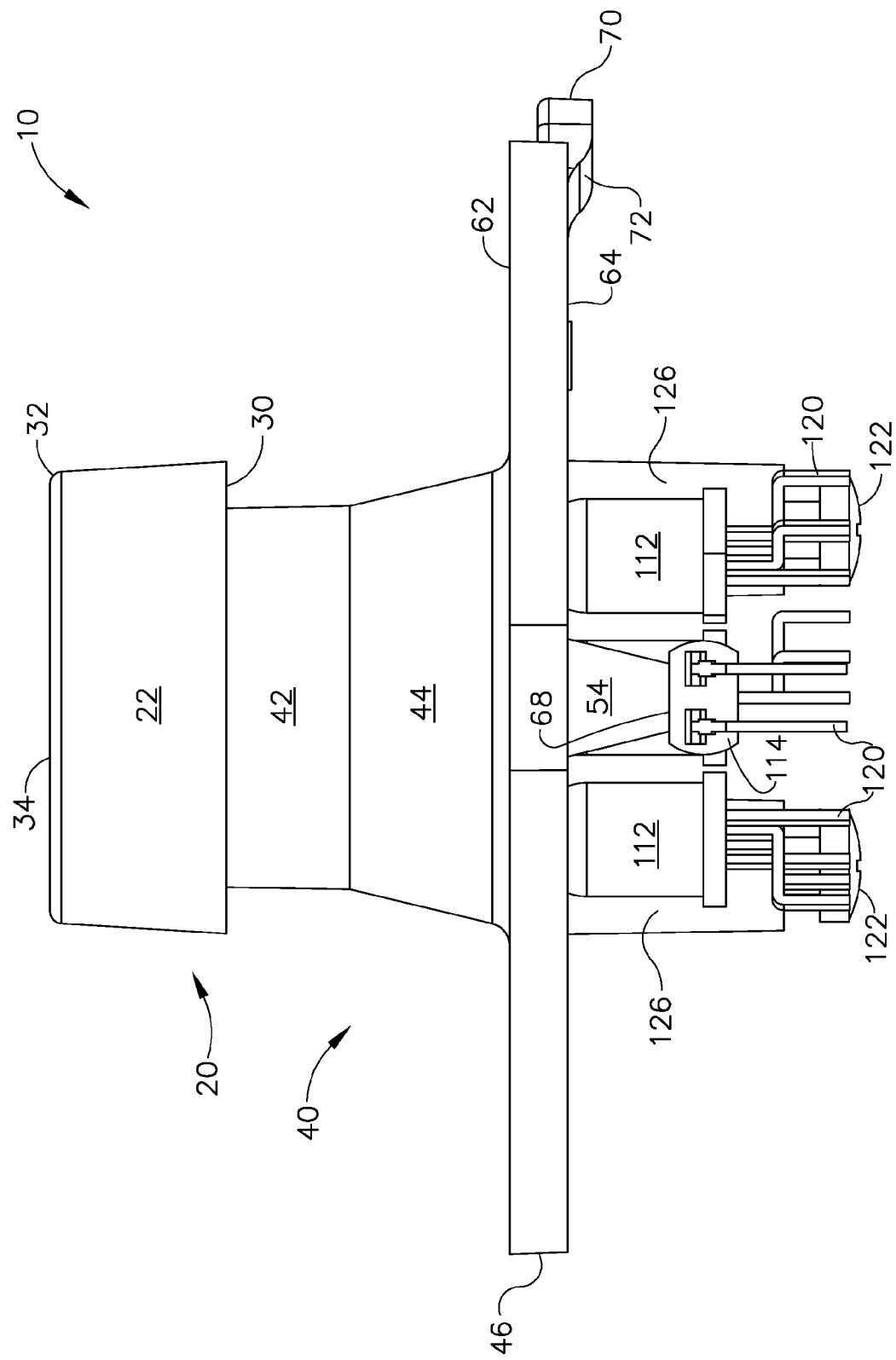
FIG. 6 is a rear, elevational view of the lens of FIG. 1, without the printed circuit board.

The reflector portion 40 also has some interesting internal shapes, including the circular protrusion 48 that fits into the circular notch 28 of the top cap, an outer cylindrical surface 42 that essentially maintains a constant radius, which extends to an outer sloped surface 44 that nearly maintains the outer cylindrical shape. This sloped surface 44 continues until reaching the mounting flange formed by the outer circumferential surface 46, by continuing to a large outer surface 62 that can be seen on FIG. 5. The surfaces 42 and 44 form an upper (in FIG. 4) outer perimeter of the reflector portion 40 that is generally cylindrical in shape. In this illustrated embodiment, the surface 42 is substantially cylindrical, having a circular outer perimeter that is of a substantially constant radius, while the surface 44 is only generally cylindrical, since it tapers outward as one looks down in a directed from the top cap 20 toward the flange upper surface 62—FIG. 6 shows these shapes quite well. It will be understood that the term "substantially cylindrical," which is used to describe the shape of certain structures that are disclosed herein, does not mean "strictly cylindrical." In other words, a substantially cylindrical shape could of course have a purely circular outer perimeter, but it could also be somewhat elliptical or even egg-shaped, and still adequately work to receive light beams, or transmit light beams, for the purposes of this technology.

On the opposite side of the flange is a large surface 64 that is mostly circular at its outer diameter, and as one travels toward the center of that circle, one comes upon a sloped surface 52 that extends downward (in this orientation of FIG. 3) until reaching a point where the slope begins aiming upward again at 54. The sloped surfaces 52 and 54 form a tapered inner perimeter that creates a "pocket" or space that is designed to capture light that is emitted from the LEDs 112 that are positioned just below that "pocket" or space (see FIG. 4). The capturing (i.e., refracting) of light rays will be discussed below in greater detail.

These sloped shapes are essentially symmetrical about a (vertical) centerline of the reflector 40, and the sloped surface 54 creates a truncated conical or "wedge" extending portion at 58. As will be discussed below in greater detail, this extending portion 58 will act as a light guide, by directing light beams that are received by the lens 10, upward (in this view of FIG. 3) until reaching the truncated surface 68 of the reflector portion 40, where a photosensor 114 is positioned, as can be seen in FIG. 3. As will be discussed below, the main purpose of the lens 10 is to direct light beams that are received from external sources to this photosensor 114, and also to direct light beams that are emitted by the LEDs 112 through other portions of the reflector 40 and top cap 20, so that they are emitted to the outside or external environment, and thus can be seen by the human eye of a worker (user) on the jobsite. The centerline of the reflector 40 is essentially co-linear with a centerline of the top cap 20, when those two pieces are mated together to create the overall subassembly lens 10.

Figure 4:
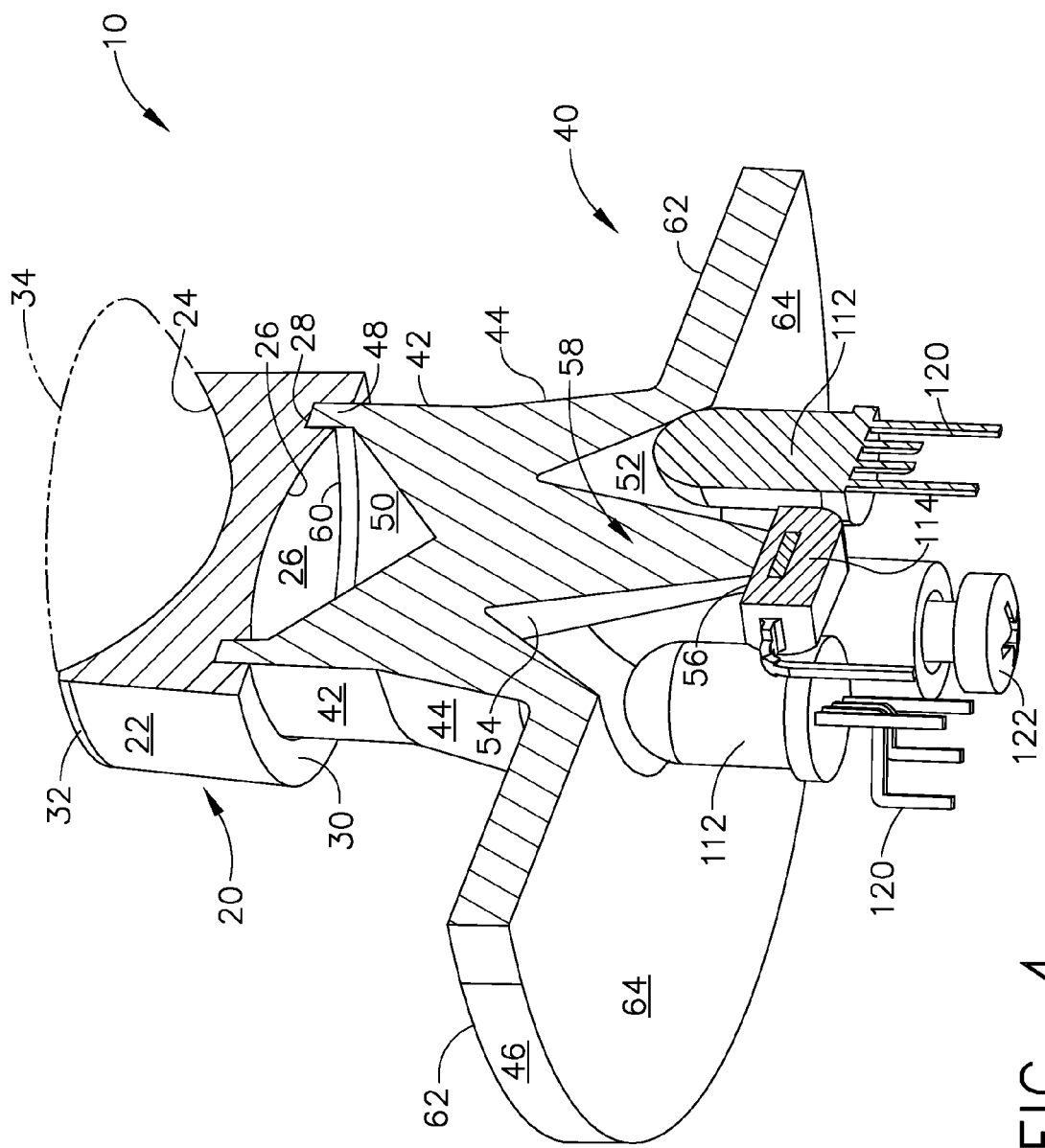
FIG. 4 is a partial cutaway view in perspective of the lens of FIG. 1, showing the lens right side up, as viewed from below.

Referring now to FIG. 4, the lens 10 is again seen in a perspective, cross-section view, this time it is right side up. This view shows essentially the same components as were seen in FIG. 3, but that is because the viewer of FIG. 4 is looking at the bottom portion of the assembly 10. Virtually the same shapes and surfaces that were described in reference to FIG. 3 are again seen on FIG. 4. However in FIG. 4 one can see a sloped surface 50 that is formed at the upper-most region of the reflector 40. This sloped surface 50 forms what appears to be a pyramidal shaped surface when viewed on FIG. 4. However, sloped surface 50 actually is a generally conical region that comes to a fairly sharp point; note that, in some of the other figures (such as in FIG. 5), the generally conical shape formed by the sloped surface 50 is essentially rounded at its tip. Both of these "tip shapes" (sharp or rounded) will adequately work for the purposes described herein, although it should be mentioned that the more rounded tip is probably easier to mold as a plastic part, particularly with regard to its releasing from the injection mold machine.

Another surface that is seen in these drawings is at 32, which is a somewhat chamfered shape that is at the upper-most outer edge of the circumferential outer shape of the top cap 20. As can be more readily seen in FIG. 5, this upper shape 32 is the surface that joins the outer cylindrical shape 22 to the inner arcuate (concave) shape 24.

Referring now to FIG. 6, the lens 10 is illustrated in an elevational plan view from the rear, and clearly shows the bottom surface 68 of the truncated conical portion 54 of the reflector 40. Also visible on FIG. 6 is a bottom portion 72 of the small extending tab 70 along the outer perimeter of the circular (or cylindrical) outer surface 46 of the mounting flange portion of the reflector 40.

Figure 7:
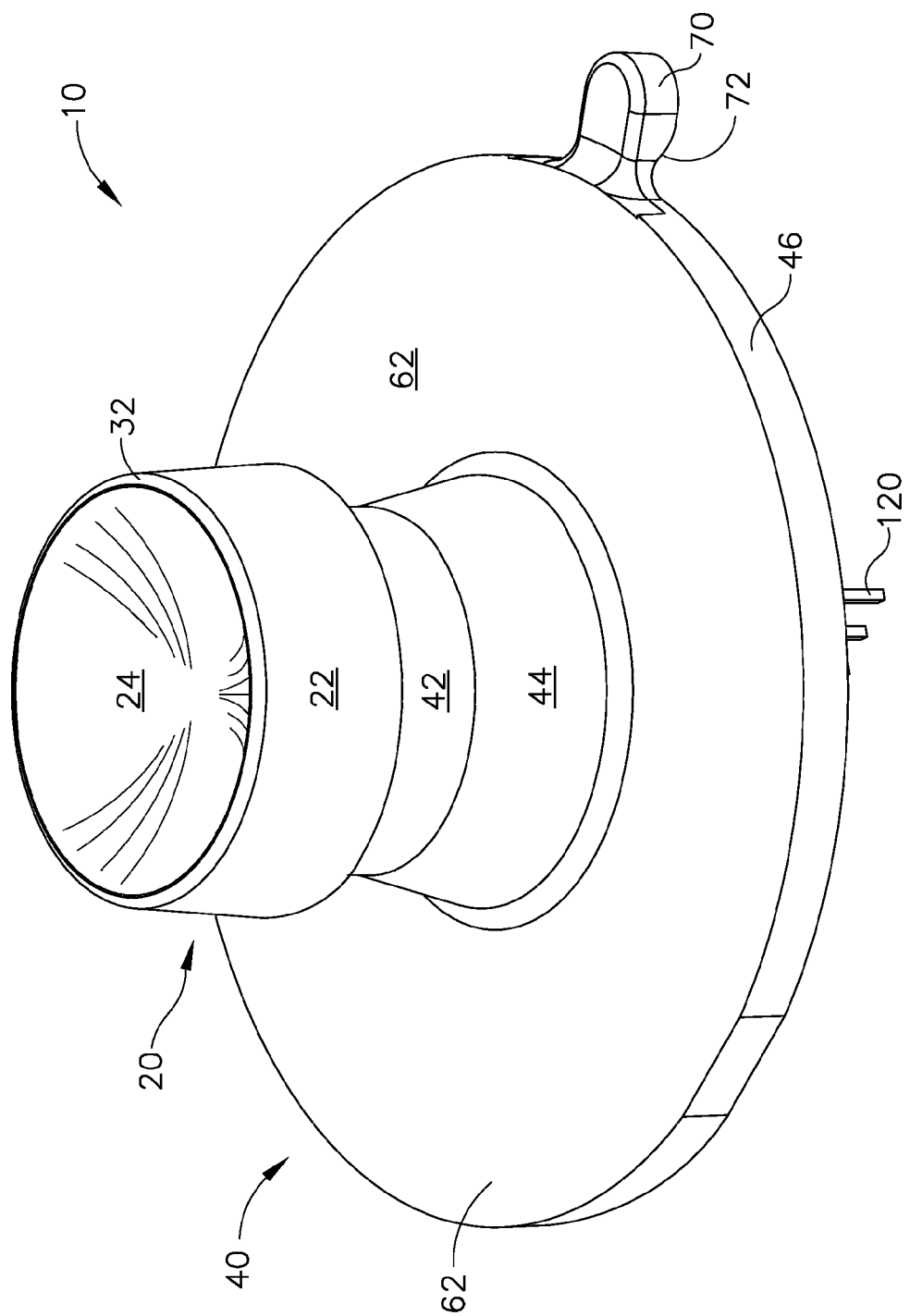
FIG. 7 is a perspective view from above and the right hand side of the lens of FIG. 1, without the printed circuit board.
Figure 8:
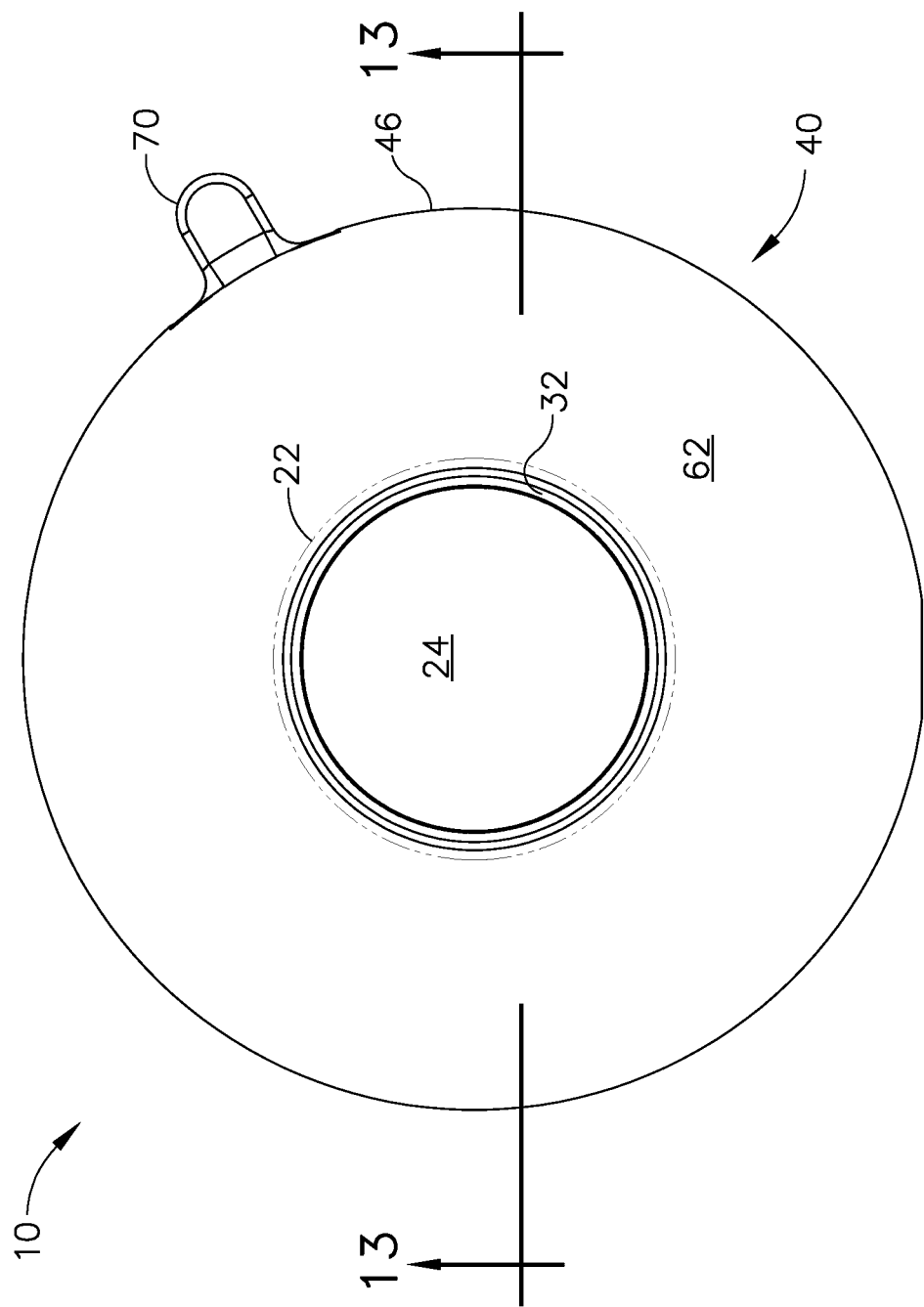
FIG. 8 is a top plan view of the lens of FIG. 1.

Referring now to FIG. 7, the lens 10 is illustrated in a perspective view from above, showing the shape of the small protruding tab 70, and showing the upper shape of the top cap portion 20. Referring now to FIG. 8, the lens 10 is illustrated in a top plan view, and exhibits a section line 13-13, which will show a cross-section view on FIG. 13.

Figure 9:
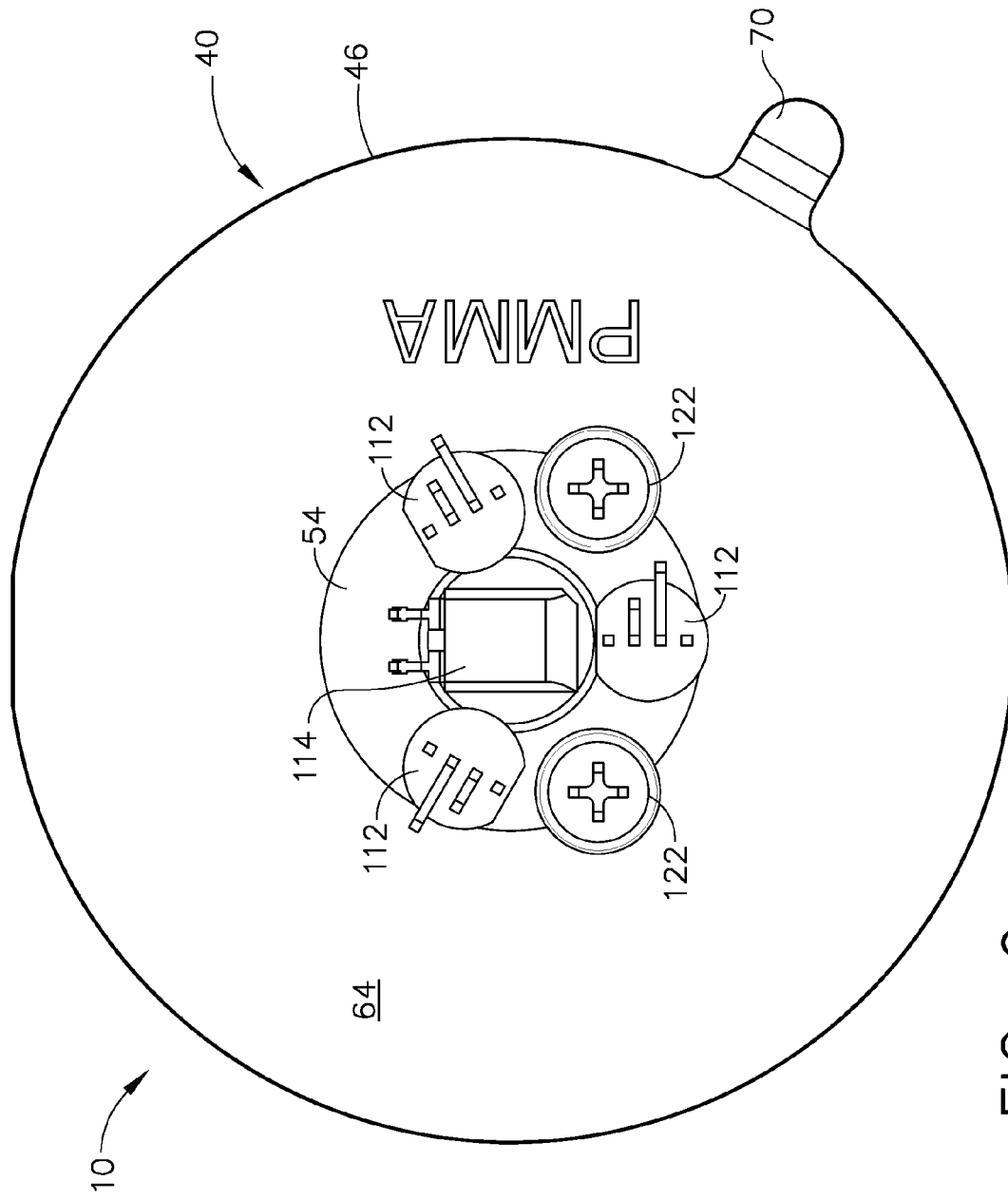
FIG. 9 is a bottom plan view of the lens of FIG. 1, without the printed circuit board.

Referring now to FIG. 9, the lens 10 is shown in a bottom plan view, showing the general positions of the electronic components, including the LEDs 112 and the photosensor 114. This view does not show the actual printed circuit board 110, which normally would block the line of sight to these electronic components that are seen on FIG. 9.

Figure 10:
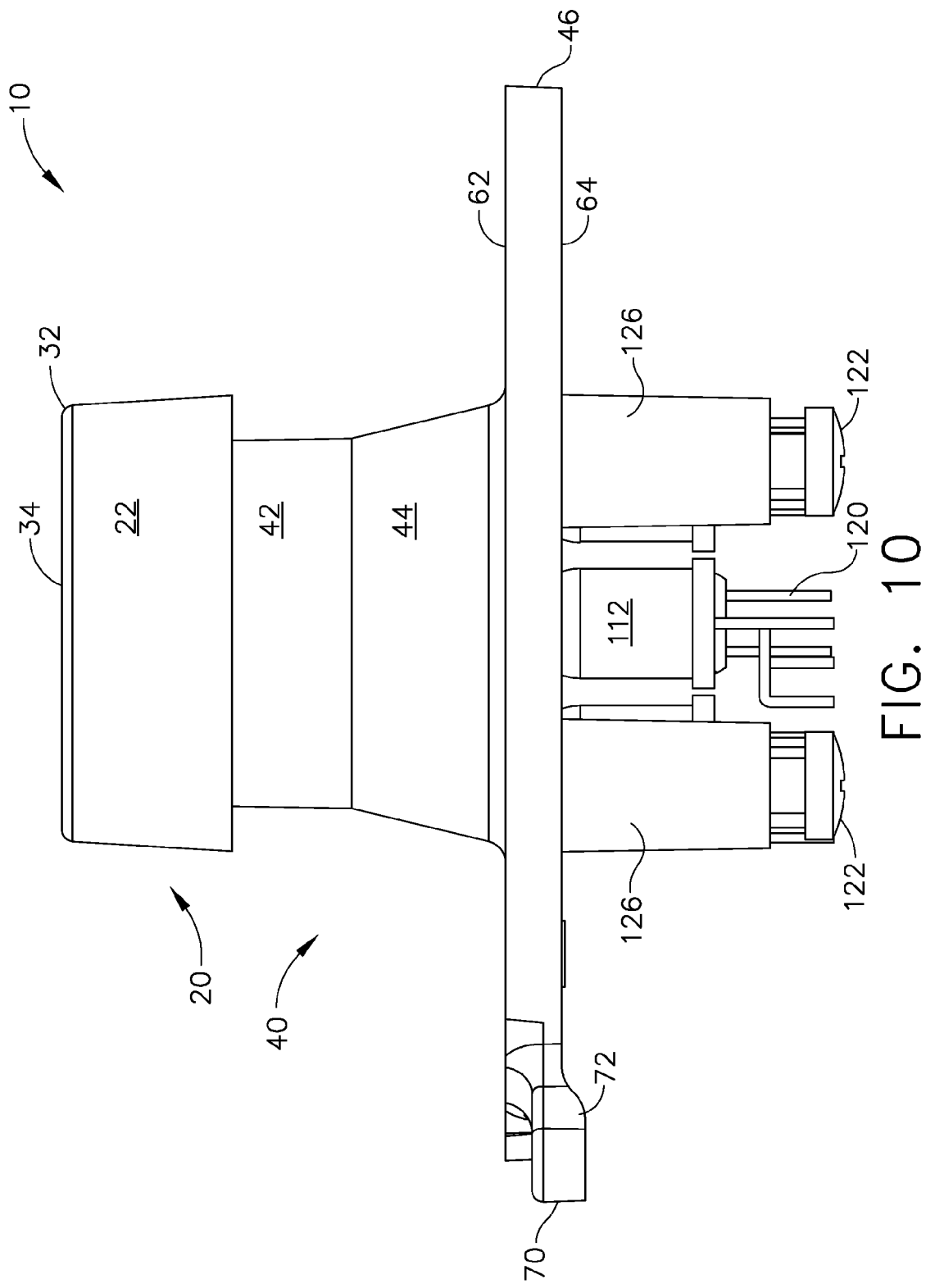
FIG. 10 is a front elevational view of the lens of FIG. 1, without the printed circuit board.
Figure 11:
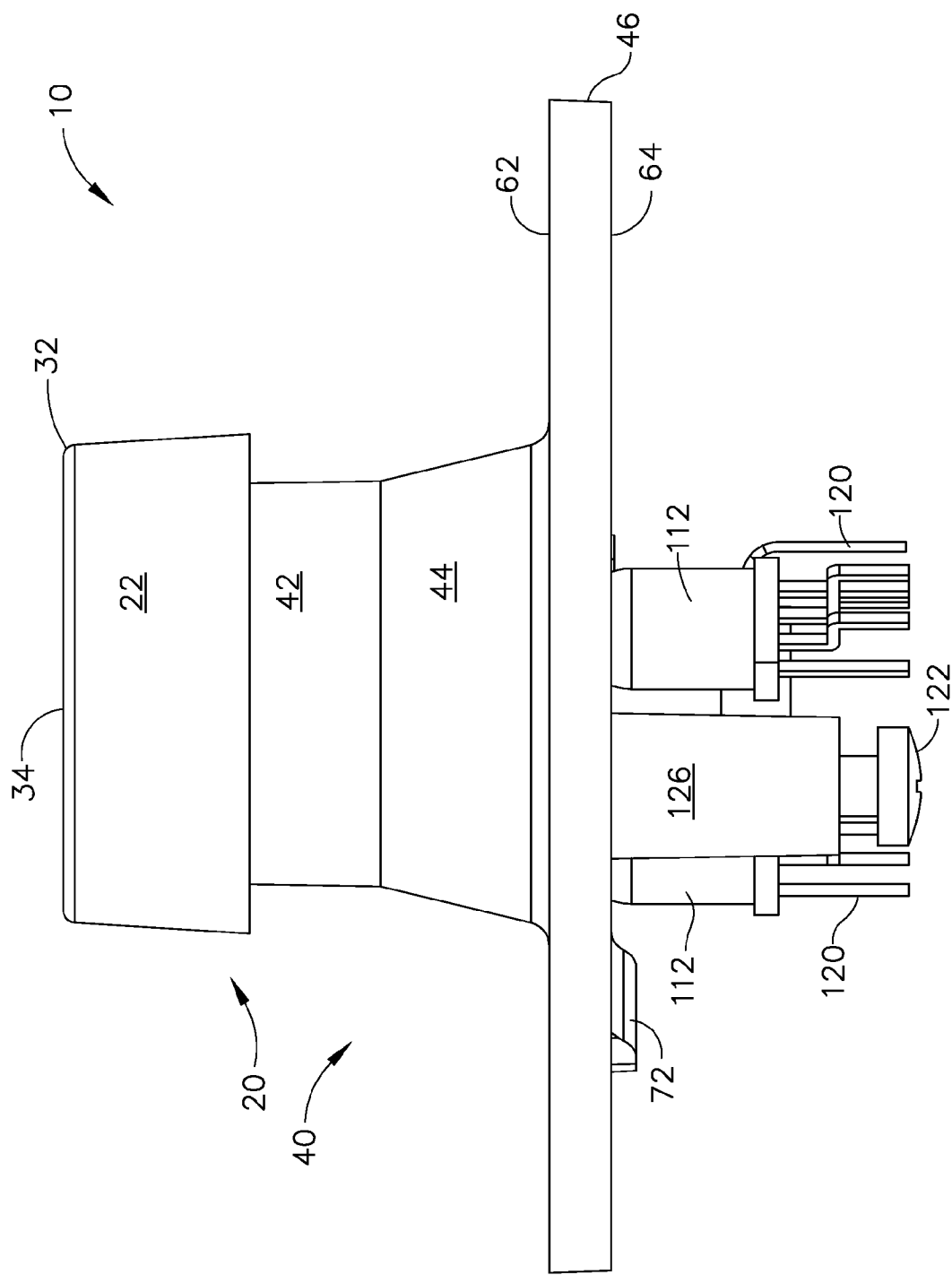
FIG. 11 is an elevational view from the left side of the lens of FIG. 1, without the printed circuit board.
Figure 12:
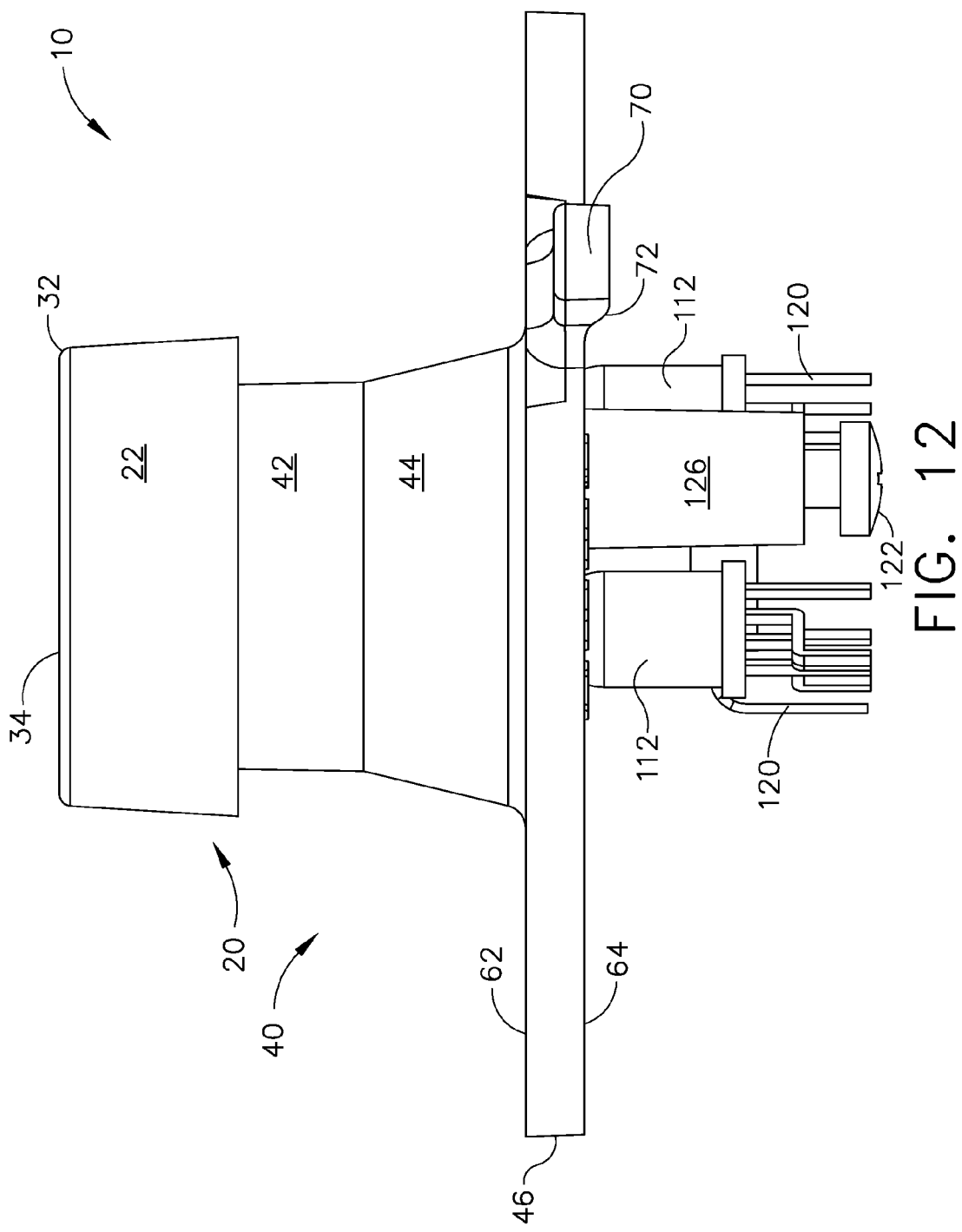
FIG. 12 is an elevational view from the right side of the lens of FIG. 1, without the printed circuit board.

The next three views are all elevational views showing the entire lens 10, minus the printed circuit board. FIG. 10 is a front view, while FIG. 11 is a left side view, and FIG. 12 is a right side view. These three views, with the addition of the rear elevational view of FIG. 6, show the entire two-way omnidirectional lens 10 from all four quarters, in elevation.

Figure 13:
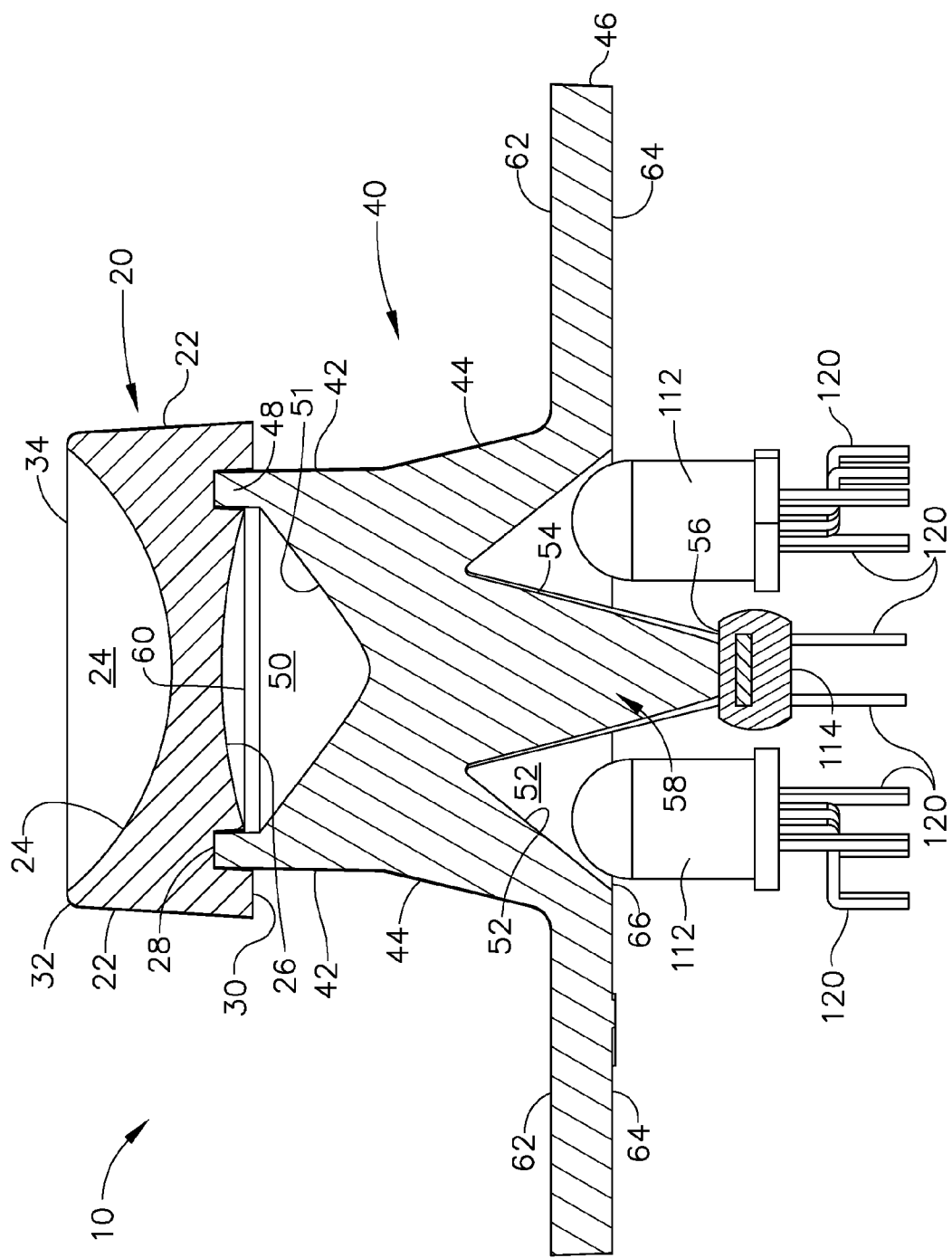
FIG. 13 is a front section view in an elevational configuration of the lens of FIG. 1, taken along the line 13-13 as seen on FIG. 8, without the printed circuit board.

Referring now to FIG. 13, the lens 10 is illustrated in a full cross-section view in an elevational configuration. The various internal and external shapes of the reflector portion 40 are all illustrated and designated by reference numerals, including the extended truncated conical wedge-shaped portion 58, which is defined by its outer surface 54, and terminates at the bottom planar surface at 68 (see FIG. 6); and on the opposite side of that interior shape is a surface 52 that forms a different truncated conical shape toward the outer diameter of the reflector portion, and has a bottom circular outer edge at 66, which is essentially co-linear with the surface 64, in this elevational front view. It will be understood that there is a space between the arcuate surface 26 and the generally conical surface 50; this space can be an air gap, or it can be filled with a specific gas compound during assembly of the lens 10; it could even be made a vacuum, if desired.

The upper surface of photosensor 114 is generally indicated at a reference numeral 56. This surface is essentially co-linear (in this horizontal view) with the bottom surface 68 of the truncated conical portion 58—see FIGS. 3 and 6. (Note: there could be an air gap between the bottom surface 68 of the lens portion 54 and the top surface 56 of the photosensor 114, without degrading performance to a significant degree.) The top portions of the reflector 40 are also illustrated on FIG. 13, including the conical shaped-surface 50, which has a top edge 60. An opposite arcuate (concave) portion having a surface 26 is seen in this view, and that surface 26 is part of the top cap portion 20. Surface 26 makes up the bottommost surface that transmits light beams therethrough, and above that is another arcuate (concave) surface 24 that is the topmost portion of the top cap 20. In general, the "bottom" surface at 68 for the light guide portion 58 is proximal to the photosensor 114, while the upper surface at 50 represents the distal surface for light guide portion 58. The "side" internal surfaces 52 and 54 are proximal to the LEDs 112, and are designed to "capture" the majority of the light being generated by the LEDs 112 of the lens device 10, and then to direct (or guide) that emitted light upward toward the distal surface 50 of the light guide portion 58, as well as the outer surfaces 42 and 44.

Now that the shapes have been described and illustrated, a general discussion of the purpose of this lens 10 is in order. The main purpose is to receive light beams from all angles around a horizontal plane (in other words, to receive light beams from all directions of the compass that are somewhat (or nearly) horizontal, with respect to the Earth's surface). Once those light beams have been intercepted by the reflector portion 40, they will be re-directed down to the photosensor 114. In addition, light beams that are emitted by the LEDs 112 will be received by the reflector's bottom area (i.e., at surfaces 52 and 54), and those light beams will be transmitted and re-directed both by the reflector portion 40 and by the top cap portion 20. These light beam pathways will now be discussed in some detail.

To do these things with light beams, both the reflector 40 and top cap 20 need to be made of a light-conducting material, such as clear (transparent) plastic, or nearly-clear plastic. In one preferred mode of this device, certain surfaces of the top cap 20 and reflector 40 have a matte finish (or some other method of texturing their surfaces), to somewhat diffuse the light beams as they are emitted by the LEDs 112. The textured surfaces can be formed by various manufacturing techniques, including, for example, designing the surfaces with some form of dimpling or other mechanical coarse shape, a mechanical roughening technique by use of an abrasive, a chemical roughening technique by use of a chemical bath or etching process, a paint or other coating with a matte finish, and the like. Also, certain surfaces (as discussed below) will intentionally be made reflective, perhaps by polishing. The intended result of polishing on a particular external surface area will, in some cases, be that light rays (photons) will reflect off the interior portion of the light-conductive material at that particular area—depending on the angle of incidence of that light ray. Of course, light rays striking that particular area from its exterior side also may well reflect, rather than refract.

It will be understood that the materials used to construct the top cap 20 and the reflector 40 can be of virtually any type of light-conducting materials, including glass or plastic materials. In one embodiment of lens 10, these parts are made from molded acrylic plastic, and the top cap portion 20 is adhesively bonded to the reflector portion 40, at the mating areas 28 and 48, respectively. The interior surfaces, such as the surfaces 50, 52, and 54, can have a clear polished plastic (smooth) finish, especially for the surfaces 50 and 54, in which near-total internal reflection is desired. The outer surfaces 42 and 44 are generally also clear polished (smooth) plastic. The interior surface 24 of the top cap 20 preferably is painted white to create an internal scatter. (It will be understood that other colors, or other types of finish could be used instead of paint.) Furthermore, the outer surface 22 around the entire circumference of the top cap 20 preferably is textured in some way to create an external scatter of the light beams. One way to accomplish that is to have a matte finish in the plastic. As noted above, both surfaces 24 and 26 of the top cap 20 are arcuate in shape, and essentially can be a portion of a hemisphere.

Figure 16:
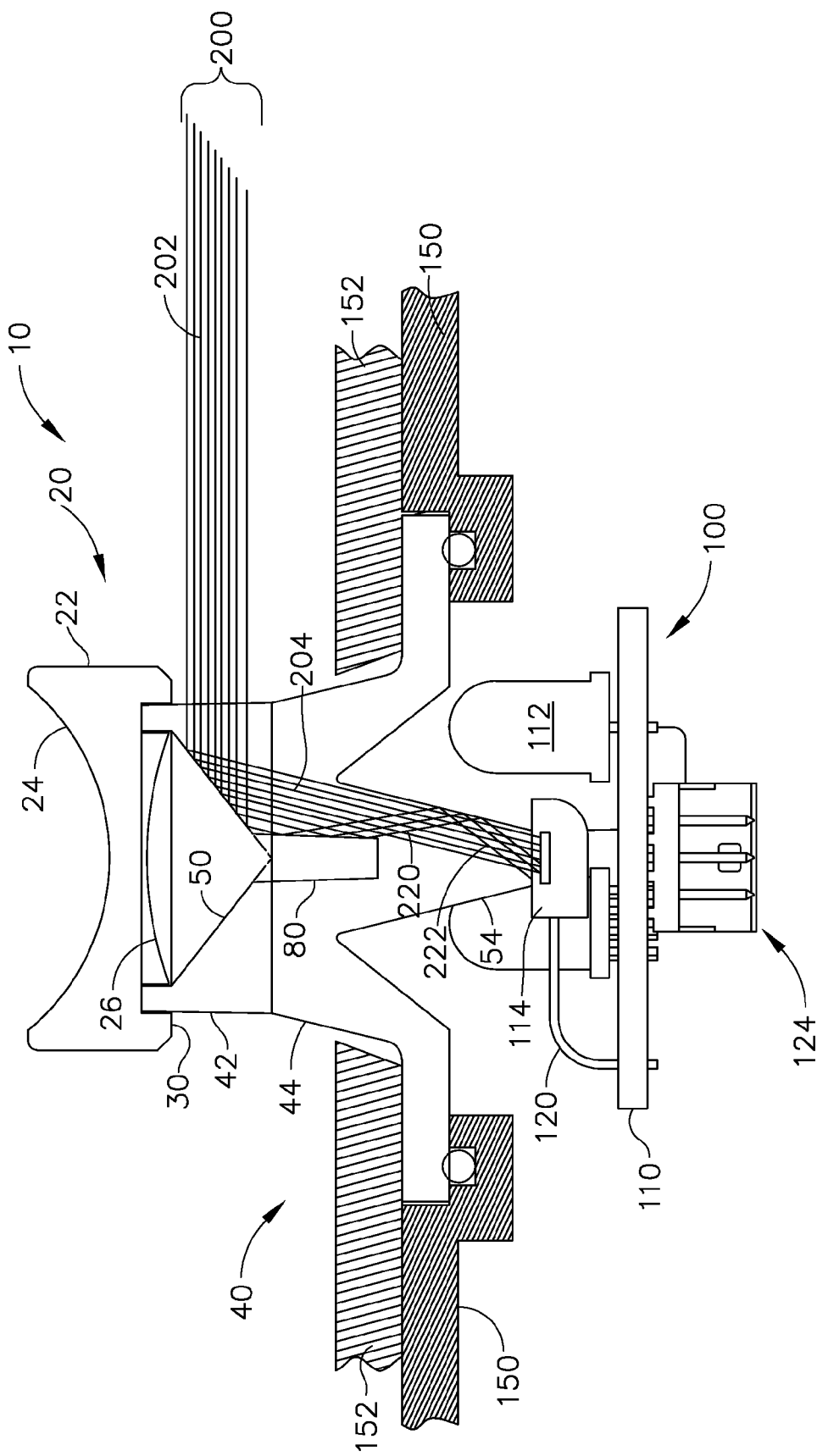
FIG. 16 is a diagrammatic view in cross-section of the lens of FIG. 1, showing multiple incoming light lines.

The internal surface 50 may appear to be designed to try to focus the light to a point. However, that is not actually the case for this technology, and it is there to more or less aim the incoming light beams towards the wedge-shaped extension portion 58, but not to try to actually focus those beams. At the top surface of the photosensor at 56, an optical filter can be included, if desired. This would allow unwanted electromagnetic frequencies in the near-visible light range to be eliminated, and thus not falsely trigger the electronics for the photosensor 114. As stated above, the exact shape of the bottom "tip" portion, at the area 59 (FIG. 14), that "point" could be a rounded surface, or could even be designed to intersect with a "core hole" that could be formed in the reflector portion 40. FIG. 16 shows a possible shape for a core hole, at the reference numeral 80. In other words, this exact shape is not entirely critical to achieving the goals of the lens 10.

Figure 14:
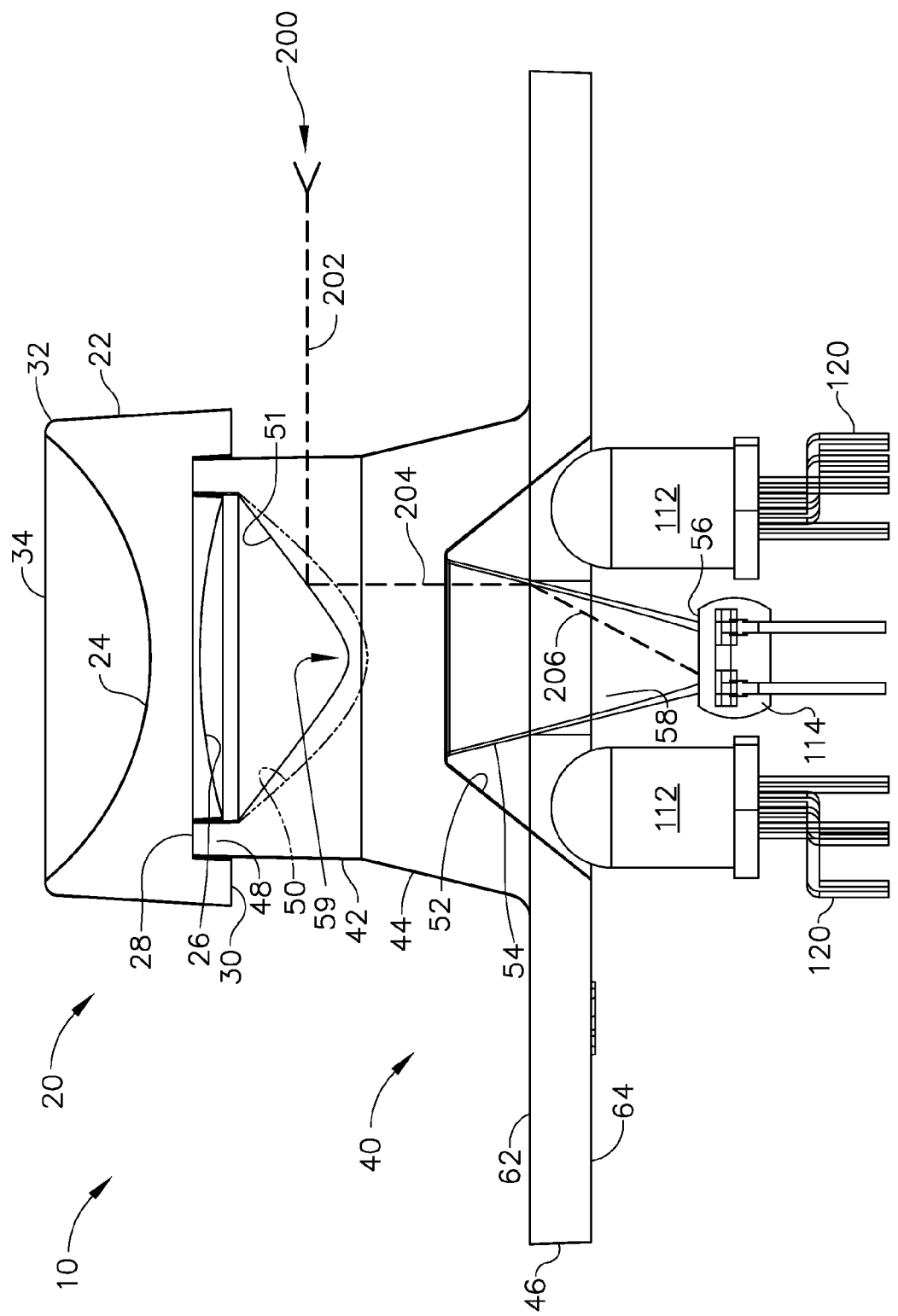
FIG. 14 is a diagrammatic view in cross-section of the lens of FIG. 1, showing an incoming light line example, without the printed circuit board.

Referring now to FIG. 14, the various important shapes of the lens 10 are illustrated in a view that emulates a section view, but shows all of the external and internal surfaces in solid lines. This is to visually differentiate those surfaces from the dashed lines which represent light beams in this view. An example incoming light beam is illustrated at the reference numeral 200. It has a first line segment 202 that comes in from the right side horizontally (as seen on this figure) and intersects the internal surface 51, which is part of the overall surface shape (off-center) of the conical surface 50. Light beam 200 is now reflected and re-directed downward along a line segment 204 until it reaches a reflecting surface 54, at which point it is again re-directed to become a line segment 206. This line segment 206 intersects the upper surface 56 of the photosensor 114. It will be understood that this is only a single example of a light beam coming in horizontally at a particular elevation or height along the mid-surface 42 of the reflector portion 40. Another more complete example is provided with respect to FIG. 16.

Figure 15:
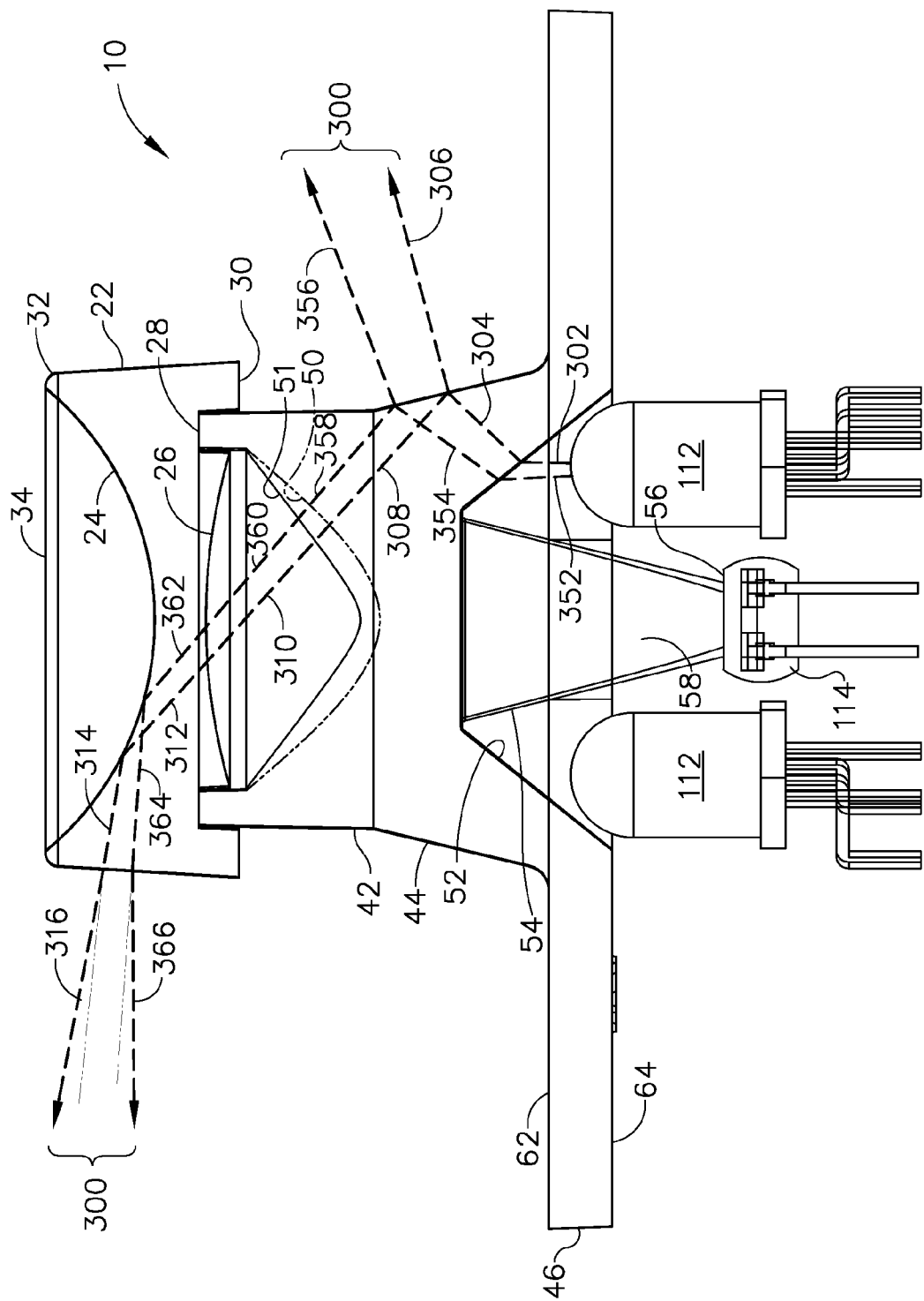
FIG. 15 is a diagrammatic view in cross-section of the lens of FIG. 1, showing an outgoing light line example, without the printed circuit board.

Referring now to FIG. 15, the right-hand LED 112 (in this view) emits two separate light beams at line segments 302 and 352. In general, this view is acting as an example showing outgoing light beams, which as a group are generally referred to by the reference numeral 300. Once reaching the surface 52, both light beams are refracted and re-directed, and become line segments 304 and 354, respectively.

Upon reaching the external surface 44, a portion of the light beams is refracted and a portion of these light beams is reflected. (It mostly depends on the exact incidence angle of the photon when it reaches an interface between the media.) The refracted portions become the light beam line segments 306 and 356, respectively. The reflected portions become the light beam line segments 308 and 358, respectively. Once those two light beams 308 and 358 reach the internal surface 51 (which is part of the overall surface 50), the light beams are perhaps slightly re-directed, and become line segments 310 and 360, respectively. (Note: at these incidence angles on FIG. 15, the light beams 308 and 358 are refracted at surfaces 50 and 51; at many other (less perpendicular) incidence angles, the light beams would have been internally reflected by those same surfaces 50 and 51.) These two light beams continue through the gap below curved surface 26 and through that surface 26, where they might be slightly re-directed to become line segments 312 and 362, respectively. These light beams reach the upper arcuate surface 24 and are re-directed (by internal scattering) at that point to become line segments 314 and 364, respectively. They finally reach the external surface 22 where they are again re-directed (by external scattering) and become the light beams 316 and 366, respectively.

It can be seen from a quick inspection of FIG. 15, that each of these emitted light beams 302 and 352 become light rays that, at two nearly opposite azimuth angles (or directions), are finally emitted from the overall lens 10. This is desired, because the outgoing light beams are going to be used to attract the attention of a human user on a construction jobsite, and it is desired that the human user can see the light beams; or more accurately stated, it is desired for the human user to see at least one of the multiple light beams that are being emitted by a single LED from any angle while standing on the surface of the jobsite near the omnidirectional lens 10. A more complete example of the outgoing light beams is provided in FIG. 17.

Referring now to FIG. 16, an example of several incoming light beams is provided, in which a plurality of light beams are generally represented as a group by the reference numeral 200. In this example, these are essentially parallel light beams that are nearly horizontal, and they begin at this angle (or these angles) at a reference numeral 202. After striking the internal conical reflective surface 50, they are re-directed downward and become line segment light beams 204. Some of the light beam line segments 204 strike an internal core hole 80, and are reflected and re-directed as line segment light beams 220. Those light beams are bounced off of the reflective surface 54 and become re-directed as line segment light beams 222. Ultimately, most of the light beams 202 are re-directed one way or another until they reach the upper surface of the photosensor 114.

It is desired that light beams from virtually any direction around the compass that are somewhat (or nearly) horizontal to the Earth's surface will eventually be re-directed to the photosensor 114. Since the internal and external surfaces of the lens 10 are essentially symmetrical about a centerline (that is vertical with respect to the Earth's surface), it will be understood that any light rays that travel nearly horizontal (at the appropriate elevation) so as to strike the outer surfaces 42 and 44 will mostly be re-directed to the photosensor 114. As can be seen on FIG. 16, the photosensor can be comprised as an integrated circuit chip with electrical leads 120 that are connected into the printed circuit board 110.

Figure 17:
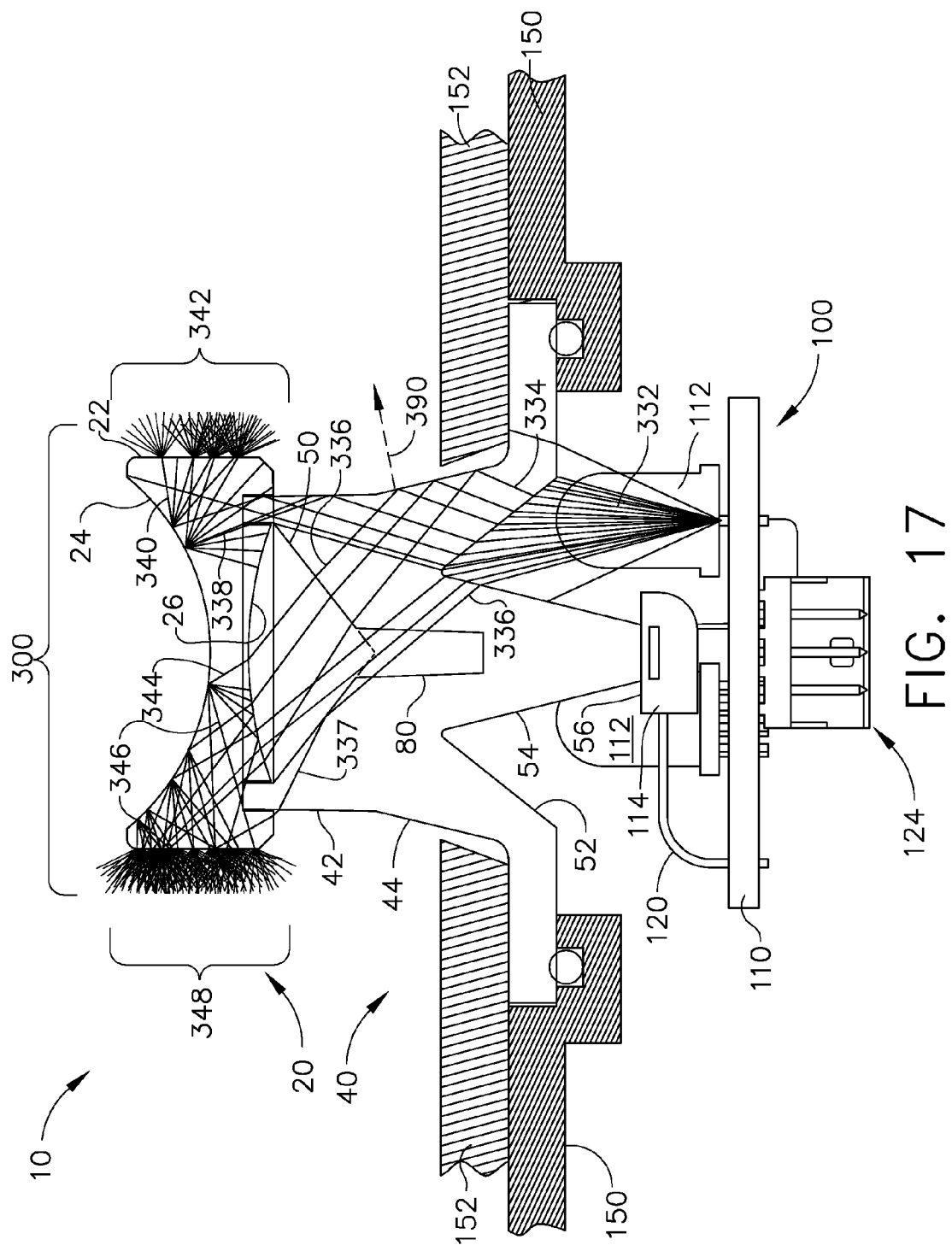
FIG. 17 is a diagrammatic view in cross-section of the lens of FIG. 1, showing multiple outgoing light lines.

Referring now to FIG. 17, this is an example of multiple light beams that are emitted by the right-hand LED 112, as seen in this view. The LED emits multiple light beams that are generally designated by the reference numeral 332. These light beam line segments 332 are emitted at many different angles, as would be expected with a standard LED (which is not a laser diode).

These light beams 332 now reach two of the internal surfaces 52 and 54 of the reflector portion 40, at which point their paths are refracted and re-directed. These beams now become multiple line segment light beams at 334 and 336. Some of these light beam line segments 334 will reach the outer surface 42 or the outer surface 44 of the reflector portion 40, and some of their energy will be refracted externally, and become external light beams generally designated by the reference numeral 390. Those light beams that are not refracted, but are instead reflected (which will occur for most of the photonic energy), become other line segment light beams along other pathways also at 336. The multiple light beam line segments 336 now intercept the internal surface 50, and those that have a fairly normal angle of incidence will be refracted outward perhaps without changing their angle of flight very much. Some of those light beams 336 will intercept the opposite portion of the conical shaped surface 50 and will be reflected at a greater angle to become light beam line segments 337 (those that are on the left-hand side of the reflector 40 in this view of FIG. 17).

Most of these multiple light beams 336 and 337 will have paths that eventually reach the top cap portion 20, although some of the light beams will refract out from the reflector itself, as discussed above (to become one of the light beams 390). Along the right-hand side in this example view of FIG. 17, those light beams that reach the top cap 20 will become light beam line segments 338 or 340, where they will reflect internally off the top arcuate surface 24 and be re-directed (by internal scattering) toward the circumferential surface 22 around the outer perimeter of the top cap 20. At this point the light beams will finally refract out into the external environment, and will become one of the multiple light beams that are generally designated by the reference numeral 342.

On the left-hand side of this example view of FIG. 17, the light beam line segments 336 and 344 will mostly intersect the arcuate surface 24 and be reflected internally within the top cap 20. Many of those light beams will eventually reach the outer circumferential surface 22 along the outer perimeter of the top cap 20, and will refract out into the external environment as one of the plurality of light beams 348. Most of the light beams 344 will reflect (or scatter) off the arcuate surface 24, and then become line segment light beams 346. Some light beams 346 will be re-directed downward (in this view) and reflect off the arcuate surface 26, and then be re-directed as part of the plurality of light beam line segments 346, finally to reach the outer surface 22 and be emitted as some of the light beams 348.

As can be seen from the example views of FIGS. 16 and 17, the omnidirectional lens 10 acts in two directions, both to receive incoming light rays and to emit outgoing light rays. In both modes of operation, the lens 10 acts as a 360 degree device, meaning that it is completely omnidirectional with regard to the points of the compass for receiving light rays (i.e., photons or "light beams") and for emitting them as well. When receiving light rays, most of the electromagnetic energy (i.e., the photons) will be re-directed to the photosensor 114, which will generate an electrical signal output that can be used by a base unit that is discussed in other patent literature assigned to Trimble Navigation Limited. The base units will be briefly discussed below. When generating outgoing light rays (i.e., photons or "light beams"), the lens 10 will operate in a "beacon mode" of operation, which is used to convey operational information to end users that are standing nearby on the construction jobsite. Since there are three different LEDs (112), each LED can be of a different color, and therefore they can flash at different sequences and rates, as well as emit different colors to convey operating information to the end users at the jobsite. If the three LEDs are red, green, and blue, for example, then with any combination of output energy by any of these three primary colors, virtually any desired color can be produced and emitted along a 360 degree output pattern by the lens 10 when operating in this beacon mode. This will be discussed some more, below.

Figure 18:
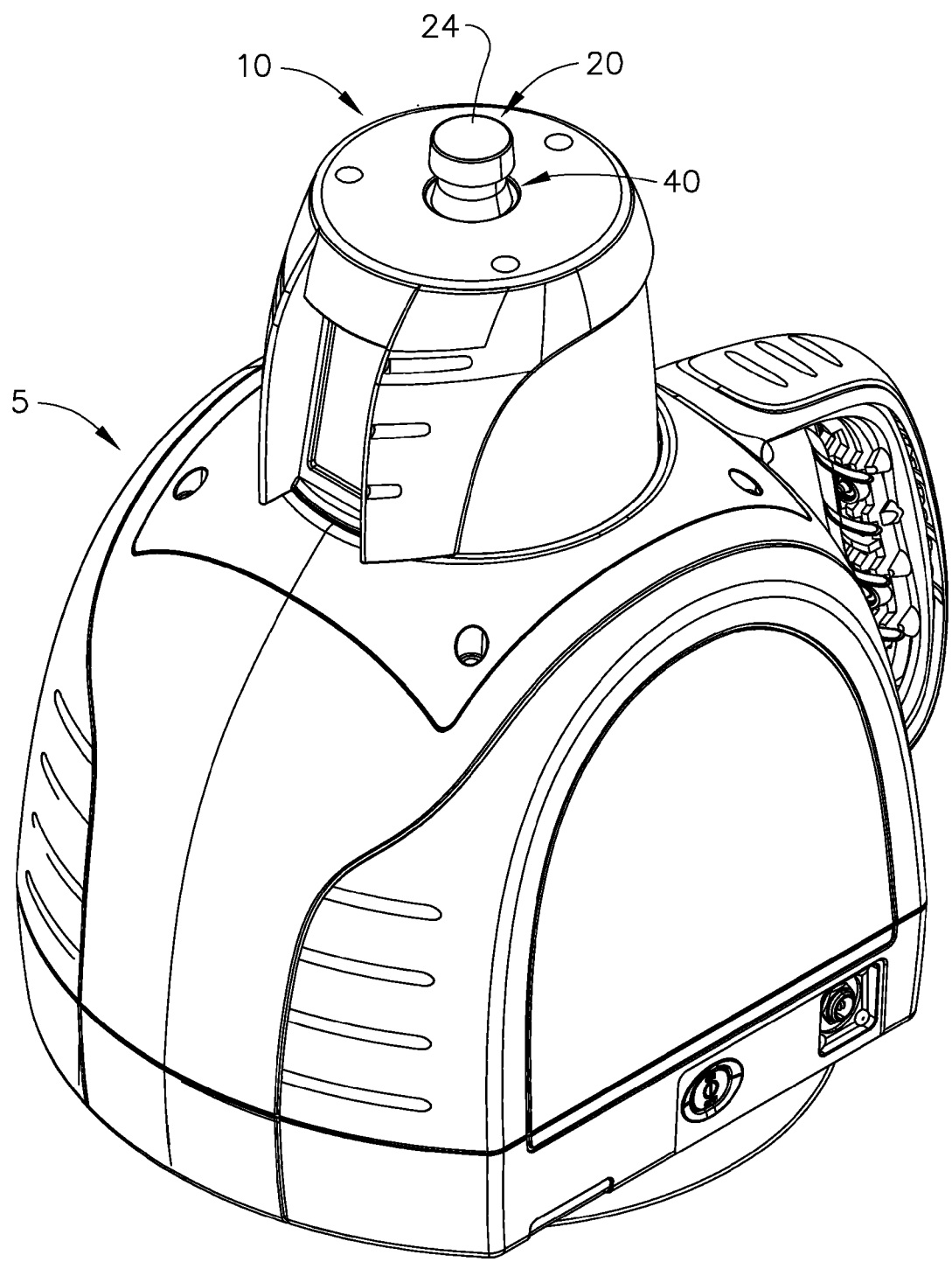
FIG. 18 is a perspective view from above showing a Trimble base unit with the two-way omnidirectional lens mounted on top, as would normally be used on a jobsite.

Referring now to FIG. 18, a Trimble base unit is illustrated, generally designated by the reference numeral 5. The two-way omnidirectional lens 10 is seated on the top portion of the base unit 5. The top cap 20 and the reflector portion 40 can clearly be seen in this view. Base unit 5 can be moved anywhere on the jobsite floor, as desired by the user. Once in position, the omnidirectional lens 10 will then be able to receive light rays from virtually any direction and redirect those light rays to the photosensor 114, which has an electrical output that will ultimately reach the base unit 5 by way of a first circuit pathway, allowing the base unit to thereby respond accordingly. When desired, the base unit will output electrical signals that drive the LEDs 112 of the omnidirectional lens 10, by way of a second circuit pathway. One or more of these LEDs 112 will then emit light rays that will be spread against the outer perimeter in an omnidirectional fashion, as described above. This allows the users at the jobsite to understand various information that the base unit is conveying, merely by seeing different colors and different patterns of flashing and repetition rates of those color flashes.

It will be understood that the photosensor and the LEDs could be replaced by purely optical components, perhaps using some future technology that allows for such devices at a commercially viable cost. In that circumstance, the above-noted first and second circuit pathways would become optical signal pathways, not electrical signal pathways. Moreover, the photosensor would become a light-gathering device that further transmits that gathered light; and the LEDs would become some type of light-emitting device that receives an optical signal—perhaps along an optical fiber—and then outputs that optical signal along multiple pathways at multiple incidence angles.

In FIGS. 16 and 17, the upper surface of the base unit is generally depicted at the reference numeral 150. A mounting plate 152 is also generally depicted and, as can be seen, mounting plate 152 will cover a portion of the upper surface 62 of the omnidirectional lens 10, thereby holding the lens 10 in place atop base unit 5.

The base unit 5 has certain capabilities that are described in earlier patent documents that are assigned to Trimble Navigation Limited. One such document is U.S. Pat. No. 8,087,176; a second such document is published application number US 2012/0203502. The published application teaches using a fan beam that is emitted by a base unit which typically consists of modulated laser light; typically either a green, red, or infrared laser generates that fan beam. In the published application, the base units have a sensitive "null-position" photodetector (or photosensor) that can delineate horizontal positioning, and can help aim the fan beam until it is directly striking the center portion of a second base unit (number 2, or BU#2), assuming the fan beam is being generated by a first base unit (number 1, or BU#1). Once the fan beam is being received at the second base unit (BU#2), its controller (i.e., at BU#2) decides what to do with regard to attempting to adjust the fan beam position (i.e., the azimuth angle) at which the first base unit (BU#1) is emitting the fan beam. The ultimate goal is to have the fan beam strike directly at the centerline of the horizontal-sensitive (null-position) photosensor on the second base unit (BU#2).

While all of the above is occurring automatically, the human users standing on the jobsite really have no exact idea what is going on between base units numbers 1 and 2 while those units are aligning (positioning) their fan beams to establish an alignment axis. That is where the two-way omnidirectional lens 10 can come into play. The lens 10 will receive an initial strike of the laser fan beam, and when that occurs, it can quickly inform the first base unit (BU#1) that its fan beam has finally found the second base unit (BU#2), although the fine positioning may not be quite yet accomplished. The omnidirectional lens 10 at the second base unit (BU#2) merely needs to be receiving some of the fan beam light from the first base unit (BU#1), and the exact fan beam position is not important at first, so long as it (BU#2) is receiving a certain minimum amount of energy from the fan beam emitted by the first base unit (BU#1).

Once that occurs, the second base unit (BU#2) will receive a signal from the photosensor 114 of the omnidirectional lens 10, and the controller in that base unit (number 2) can then start sending signals to illuminate one or more of the LEDs of this same omnidirectional lens 10. For example, a blue LED at BU#2 could start emitting light once the first base unit (BU#1) has its fan beam striking the omnidirectional lens 10 of the second base unit (BU#2). If the second base unit (BU#2) on that jobsite floor also is emitting a (second) fan beam and is trying to find the omnidirectional lens 10 of BU#1, then once that fan beam (which would likely have a different modulation signal) meets up with that omnidirectional lens (at BU#1), then the lens 10 at BU#1 could have its green LED start emitting light, thereby informing the end users on the jobsite floor that the second base unit (BU#2) is now targeting the omnidirectional lens 10 at BU#1.

In this manner, the users at the jobsite can literally "see" the base units working together, and can identify which base unit is #1 or #2 by the color of its lens 10, now being emitted during the axis alignment procedure (e.g., either blue or green color, in this example). In addition, it should be noted that the omnidirectional lens 10 can also be used with active targets, as discussed in the published application noted above.

It will be understood that the received laser beam could be profiled, and thus its position where it impacts the photosensor 114 could be calculated; or a split-cell photosensor could be used as the main photosensor 114, for example, to determine the position where the received laser beam is striking the photosensor. In either case, this sensor assembly using omnidirectional lens 10 could be used as a fine positioning sensor; moreover, other combinations of multiple photocell sensors could instead be used for that same purpose.

The omnidirectional lens 10 can also have a third LED of a third color, such as red. For example, if the red LED is illuminated, that can indicate a warning that the battery has become low on charge for the base unit (or an active target) that is carrying this omnidirectional lens 10. This will create a visual signal that will be hard to ignore by the end users on the jobsite. Many other types of control functions can be passed on to the human users by way of the various LED signals that can be produced by the omnidirectional lens 10.

Various other functions could have signals such as the following:

(1) After first being turned on, the base unit could be searching for the wireless network, and it could command the LEDs of the omnidirectional lens 10 to cycle through various color patterns, such as red, green, blue, red, green, blue.

(2) Once the base unit has found the wireless network, the LEDs could be commanded to stay on steady for several seconds. If all three LEDs were commanded to do so, then the color of the light would be white for this indication.

(3) If the base unit is "leveling," then the "main color" for that particular base unit could be flashing while the leveling function is occurring.

(4) As noted above, if the battery for this base unit is low on charge, the red LED could be commanded to energize, either as a steady signal, or by some type of repeated flashing.

(5) If there is an error status, again the red LED could be used, and again it could either be a steady signal or it could be flashing in a certain type of repetition pattern, as desired by the system designer of the base units.

(6) If the base unit is updating, based on information being received through the wireless network, then the LEDs could be emitting a purple color (e.g., this would be a red LED plus blue LED simultaneously flashing or turning on steadily).

(7) If the base unit is having its battery charged, then a slow blinking yellow light could be emitted by the omnidirectional lens 10 (which would be a red LED plus green LED simultaneously illuminating in a blinking pattern).

It will be understood that the top portion of the base unit rotates about a vertical axis, but the omnidirectional lens 10 has no moving parts. The top portion of the base unit houses the fan beam light generating device (typically a laser diode), and also houses the horizontally-sensitive null-position sensor; these devices must rotate (together) so as to move to other angles in the azimuth direction. However, the structure of the omnidirectional lens 10 has major portions that are substantially symmetrical, and therefore, the omnidirectional lens itself has no moving parts, but works well in any case in receiving light beams from substantially all angles about the azimuth, and for emitting light beams at substantially all angles about the azimuth.

Figure 19:
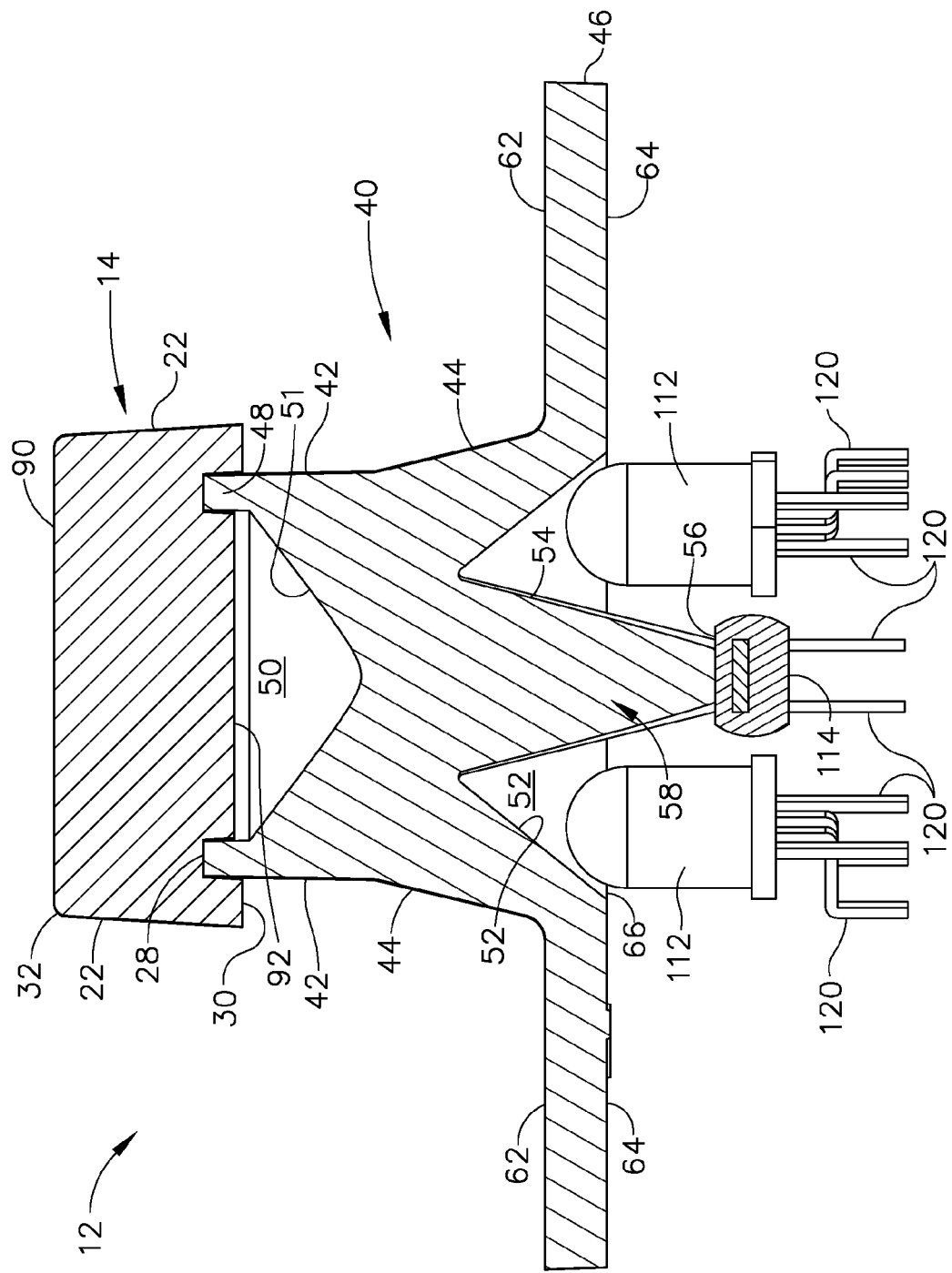
FIG. 19 is a front section view in an elevational configuration of a first alternative embodiment of a lens similar to that of FIG. 1, viewed without a printed circuit board.

An alternative embodiment for constructing the omnidirectional lens is depicted in FIG. 19. The overall structure is generally designated by the reference numeral 12, and for the most part it is quite similar to the lens 10 that is depicted in FIG. 13. On FIG. 19, the lens 12 has a more easily manufactured upper portion 14, which has substantially planar upper and lower surfaces, at 90 and 92, respectively. The light ray pathways for this alternative embodiment lens 12 will be different that those illustrated in FIGS. 16 and 17, but it will still adequately function for the most part. It is not a preferred embodiment from the standpoint of "light guide" pathway efficiency.

Figure 20:
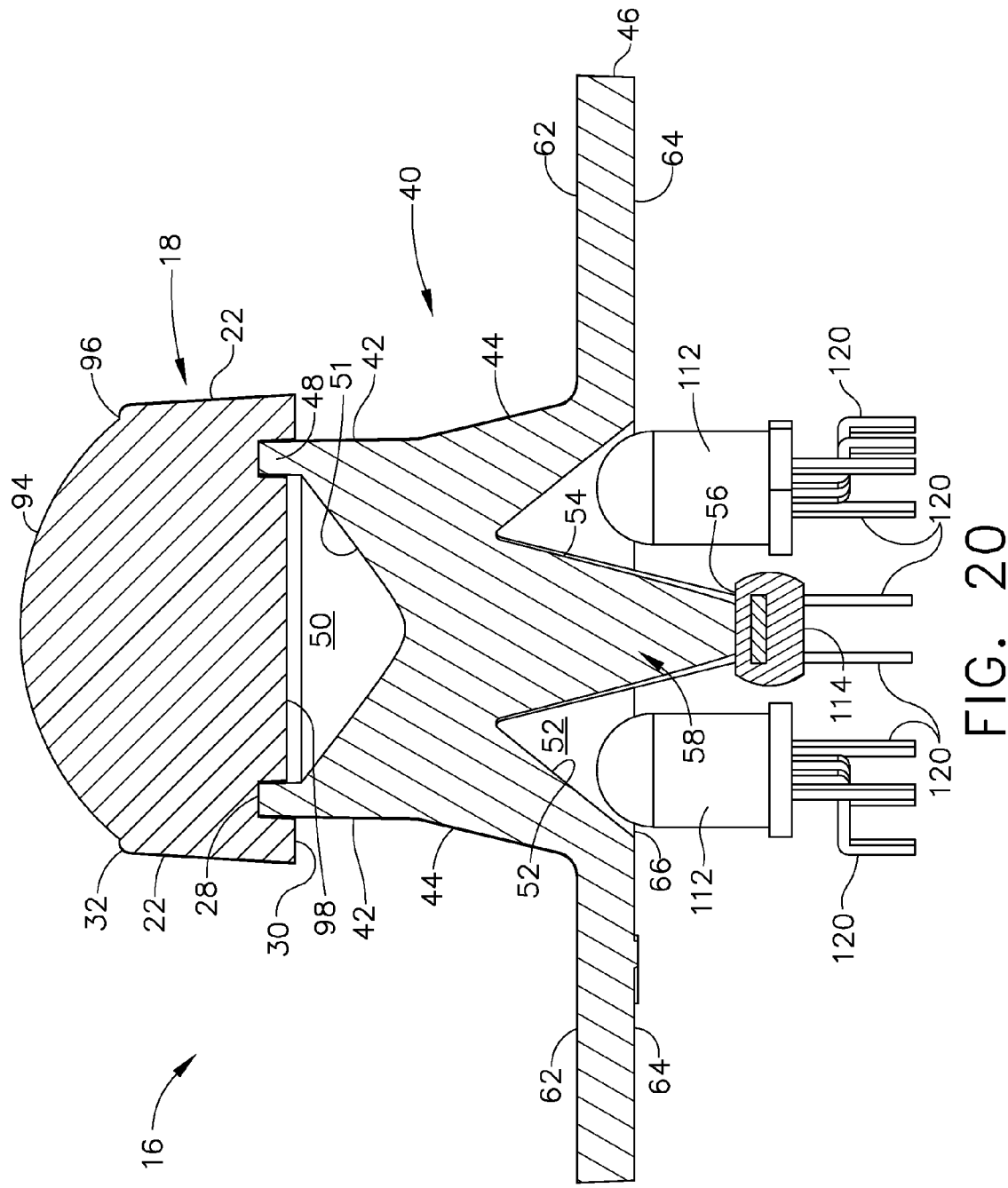
FIG. 20 is a front section view in an elevational configuration of a second alternative embodiment of a lens similar to that of FIG. 1, viewed without a printed circuit board.

Another alternative embodiment for constructing the omnidirectional lens is depicted in FIG. 20. The overall structure is generally designated by the reference numeral 16, and for the most part it is quite similar to the lens 10 that is depicted in FIG. 13. On FIG. 20, the lens 16 has a convex upper portion 18, which has an upper surface having an outer ring area at 96, and a central extending area at 94. The lower surface 98 is depicted as being substantially planar. The light ray pathways for this alternative embodiment lens 16 will be different that those illustrated in FIGS. 16 and 17, but it will still adequately function for the most part. Note that both alternative embodiments 12 and 16 could have a concave lower surface for the upper portions 14 or 18, if desired—i.e., instead of substantially planar surfaces 92 or 98, they could have a curved surface profile, similar to the surface 26 on FIG. 13.

In conclusion, the omnidirectional lens 10 is a highly efficient device in capturing light rays from all directions of the compass, particularly if these light rays are traveling in a near horizontal direction. Therefore, these lenses 10 are quite suitable for use on construction jobsites with the base units that are described in the patent and published application noted above. This same structure is also very suitable for emitting light rays in all directions when one or more of its LEDs is illuminated, to send visual information to users on the jobsite floor.

It will be understood that light rays (or "light beams") that are not travelling in a near-horizontal direction will sometimes be intercepted by the lens 10, and will nevertheless end up being re-directed to the photosensor of that lens device. If the desired modulated light "signals" (i.e., those light beams that are emitted by a fan beam of a base unit, for example) happen to be travelling at some other angle than "near-horizontal" for a particular situation on a jobsite, and if those light signals are nevertheless received by the photosensor of the lens 10 and properly decoded, then the main purpose of the lens 10 will have been accomplished. The fact that the examples presented herein show exclusively "near-horizontal" incoming light beams does not mean that the lens 10, and its main operating principles, is limited to successfully receiving only such "near-horizontal" incoming light beams. It is expected that, on a typical jobsite that has two base units resting on the same jobsite floor or surface, the received fan beams will indeed be travelling at near-horizontal pathways, because both fan beams laser emitters will be resting at almost exactly the same elevation. Knowing this fact, however, does not render the lens 10 from also properly working with non-near-horizontal incoming light beams.

It will also be understood that the received light beams discussed herein are typically laser light beams, including light beams that are emitted by a "fan beam" device, such as a Trimble base unit. Such laser light will typically be spread into a fan shape, and usually modulated with a predetermined "signal" pattern to delineate one base unit from the other on a jobsite. The laser beam can be of any desired light wavelength, although the typical lasers used in construction today often emit one of green visible light, red visible light, or infrared light. The photosensor device on the chip 114 can be designed to have the capability to receive all of these wavelengths in a single device, without changing any components. It will further be understood that laser light is not always necessary for the lens 10 to perform its functions, although certainly laser light is preferred for use with most base units.

It will be further understood that the emitted light beams discussed herein are generally not to be of laser light. In general, when the omnidirectional lens 10 is operating in its beacon mode, it is desired to "spread" the emitted light beams into many, many angles. In fact, it is preferred to spread the emitted light beams at all angles of the compass—as a 360 degree beacon.

It will be yet further understood that the terms "light ray(s)" or "light beam(s)" are generally used to refer to photons, and that such photons are typically understood to be travelling in a particular direction as they move. The term "light beam" might seem more appropriate when discussing a laser beam, however, in this patent disclosure, a light beam can be either collimated light or non-collimated light. All photons move in a direction regardless of how they are polarized, and every single photon can comprise an individual light beam, or light ray. The terms "light beam line segment" or "line segment light beam" both generally refer to the examples illustrated on FIGS. 14-17, where various light beams are reflected or refracted, and often change direction. Each line segment is merely a portion of the travel of such light beams or light rays.

As discussed above, two earlier patent documents are related to the technology disclosed herein, and are hereby incorporated by reference. These patent documents are: U.S. Pat. No. 8,087,176, titled "TWO DIMENSION LAYOUT AND POINT TRANSFER SYSTEM;" and Published Patent Application No. US 2012/0203502, titled "AUTOMATED LAYOUT AND POINT TRANSFER SYSTEM." Both of these patent documents are assigned to Trimble Navigation Limited of Sunnyvale, Calif., and are incorporated herein by reference in their entirety.

It will be understood that the logical operations described herein can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor to execute software instructions that are stored in memory cells within an ASIC. In fact, the entire microprocessor, along with RAM and executable ROM, may be contained within a single ASIC, in one mode of the technology disclosed herein. Of course, other types of circuitry could be used to implement these logical operations without departing from the principles of the technology disclosed herein. In any event, some type of processing circuit may be provided, whether it is based on a microprocessor, a logic state machine, by using discrete logic elements to accomplish these tasks, or perhaps by a type of computation device not yet invented; moreover, some type of memory circuit may be provided, whether it is based on typical RAM chips, EEROM chips (including Flash memory), by using discrete logic elements to store data and other operating information, or perhaps by a type of memory device not yet invented.

It will also be understood that the precise logical operations discussed above, could be somewhat modified to perform similar, although not exact, functions without departing from the principles of the technology disclosed herein. The exact nature of some of the decision steps and other commands in these flow charts are directed toward specific future models of devices used on construction jobsites (those involving laser receivers sold by Trimble Navigation Limited, for example) and certainly similar, but somewhat different, steps would be taken for use with other models or brands of sensing systems or control systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An omnidirectional lens, comprising:
   (a) a light-conductive first portion;
   (b) a light-conductive second portion, wherein said first portion is mounted adjacent to said second portion;
   (c) said first portion being substantially cylindrical in shape, having a first outer perimeter, said first portion having a first surface that faces toward and is proximal to said second portion, and said first portion having a second surface that faces away from and is distal to said second portion; and
   (d) said second portion being generally cylindrical in shape at a second outer perimeter that is proximal to said first portion, said second portion having a generally conical third surface that is proximal to said first portion, and said second portion having a fourth surface that faces away from and is distal to said first portion, said fourth surface forming a protrusion extending to a distal end;

(e) wherein: said first outer perimeter exhibits a textured surface finish, wherein: said first surface exhibits a substantially smooth surface finish; said second surface exhibits a textured surface finish; and said third surface exhibits a substantially smooth surface finish; and said fourth surface exhibits a substantially smooth surface finish, wherein: at least a portion of light rays that are intercepted by said second outer perimeter are refracted by said second outer perimeter, then reflected by said third surface and re-directed toward the distal end of said protrusion, further comprising a photosensor that is positioned proximal to the distal end of said protrusion, and which receives said at least a portion of light rays.

2. An omnidirectional lens, comprising:
(a) at least one photosensor;
(b) at least one light-emitting light source;
(c) a light-conductive material that passes light beams at predetermined light wavelengths; wherein:
  (i) said light-conductive material has first surfaces that receive first light beams from at least one external source, in which said first surfaces are shaped to re-direct at least a portion of said first light beams to said at least one photosensor that is positioned proximal to said light-conductive material, such that said omnidirectional lens is able to receive light beams from virtually any direction with regard to the points of the compass and redirect at least a portion of said first light beams to said at least one photosensor;
  (ii) said light-conductive material has second surfaces that receive second light beams emitted by said at least one light-emitting light source that is positioned proximal to said light-conductive material; and
  (iii) said light-conductive material has third surfaces, said light-conductive material being shaped to re-direct at least a portion of said second light beams toward said third surfaces, said third surfaces having a textured surface finish to scatter light into a plurality of directions with respect to a direction of travel of said second light beams.

3. The omnidirectional lens of claim 2, wherein: said first light beams comprise laser light, and said second light beams comprise visible light.

4. The omnidirectional lens of claim 2, wherein said at least one photosensor comprises a photodiode, and said at least one light-emitting light source comprises a light-emitting diode.

5. The omnidirectional lens of claim 2, wherein:
(a) said first surfaces include: (i) a truncated conical reflective surface, and (ii) a protrusion that extends toward said at least one photosensor;
(b) said truncated conical reflective surface re-directs at least a portion of said first light beams toward said protrusion; and
(c) at least a portion of said protrusion has reflective surfaces that tend to channel said first light beams toward said at least one photosensor.

6. The omnidirectional lens of claim 2, wherein:
(a) said second surfaces include at least two different sloped surfaces that form a space proximal to said at least one light-emitting light source, wherein said second surfaces receive, refract, and re-direct at least a portion of said second light beams toward said third surfaces; and
(b) said third surfaces include: (i) an outer perimeter surface that exhibits a textured surface finish, and (ii) at least one reflective surface that scatters said second light beams internally toward said outer perimeter surface, where said second light beams are emitted to an exterior environment.

7. An omnidirectional lens, comprising:
(a) at least one photosensor;
(b) at least one light-emitting light source;
(c) a substantially light-conductive material that passes light beams at predetermined light wavelengths, said light conducting material having:
  (i) a first surface portion for receiving externally-produced first light beams;
  (ii) a second surface portion that is positioned proximal to said at least one photosensor;
  (iii) a third surface portion that is positioned proximal to said at least one light-emitting light source;
  (iv) a fourth surface portion for emitting light beams, said fourth surface portion having a textured surface finish; and
  (v) a fifth portion that is shaped to direct at least a portion of said received first light beams from said first surface portion toward said second surface portion;
(d) a first circuit pathway for sending signals from said at least one photosensor to an external device signal receiver; and
(e) a second circuit pathway for receiving signals from an external signal transmitter to said at least one light-emitting light source;
(f) wherein:
  (i) said first surface portion is shaped to receive said first light beams from substantially every direction in a substantially horizontal plane;
  (ii) said third surface portion is shaped to receive second light beams from said at least one light-emitting light source, and to direct at least a portion of said second light beams toward said fifth portion;
  (iii) said fifth portion is also shaped to receive said at least a portion of said second light beams from said third surface portion, which comprise third light beams, and to direct at least a portion of said third light beams toward said fourth surface portion;
  (iv) said fourth surface portion is shaped to receive said at least a portion of said third light beams, which comprise fourth light beams, and to emit at least a portion of said fourth light beams at a plurality of directions that includes substantially every direction in said substantially horizontal plane.

8. The omnidirectional lens of claim 7, wherein said first light beams comprise laser light, and said second light beams comprise visible light.

9. The omnidirectional lens of claim 7, wherein said at least one photosensor comprises a photodiode, and said at least one light-emitting light source comprises a light-emitting diode.

10. The omnidirectional lens of claim 2, wherein: said ability to receive light beams from virtually any direction comprises 360 degrees around a perimeter of said light-conductive material.

* * * * *